(12) United States Patent
Munier et al.

(10) Patent No.: US 12,082,144 B2
(45) Date of Patent: Sep. 3, 2024

(54) METHODS, APPARATUS AND MACHINE-READABLE MEDIUMS RELATING TO REFERENCE SIGNALS FOR POSITIONING IN A WIRELESS NETWORK

(71) Applicant: Telefonaktiebolaget LM Ericsson (publ), Stockholm (SE)

(72) Inventors: Florent Munier, Västra Frölunda (SE); Iana Siomina, Täby (SE); Fredrik Gunnarsson, Linköping (SE); Per Ernström, Stockholm (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 540 days.

(21) Appl. No.: 17/290,033

(22) PCT Filed: Oct. 28, 2019

(86) PCT No.: PCT/SE2019/051058
§ 371 (c)(1),
(2) Date: Apr. 29, 2021

(87) PCT Pub. No.: WO2020/091658
PCT Pub. Date: May 7, 2020

(65) Prior Publication Data
US 2021/0410097 A1     Dec. 30, 2021

Related U.S. Application Data

(60) Provisional application No. 62/754,932, filed on Nov. 2, 2018.

(51) Int. Cl.
*H04W 64/00*    (2009.01)
*H04L 1/00*     (2006.01)
*H04L 5/00*     (2006.01)

(52) U.S. Cl.
CPC .......... *H04W 64/00* (2013.01); *H04L 1/0067* (2013.01); *H04L 5/0048* (2013.01)

(58) Field of Classification Search
CPC ..... H04W 64/00; H04L 1/0067; H04L 5/0048
(Continued)

(56) References Cited

U.S. PATENT DOCUMENTS

| | | | |
|---|---|---|---|
| 2012/0093101 A1 | 4/2012 | Dai et al. | |
| 2015/0382205 A1* | 12/2015 | Lee | H04B 7/086 370/329 |
| 2017/0134892 A1* | 5/2017 | Harel | H04W 52/146 |

FOREIGN PATENT DOCUMENTS

WO     2018031727 A1     2/2018

OTHER PUBLICATIONS

Wang et al (WO 2018/036508 A1), Signal Transmission Method and Device, Mar. 1, 2018.*

(Continued)

*Primary Examiner* — Nghi H Ly
(74) *Attorney, Agent, or Firm* — Murphy, Bilak & Homiller, PLLC

(57) ABSTRACT

Embodiments of the disclosure provide methods, apparatus and machine-readable mediums relating to reference signals for positioning in a wireless network. A method performed by a wireless device relating to positioning in a wireless network is provided. The method comprises receiving user data, and a reference signal for positioning in a transmission from a radio network node. The method further comprises rate matching the user data over one or more radio resources not used by the reference signal.

21 Claims, 18 Drawing Sheets

(58) Field of Classification Search
USPC ................ 370/329, 328, 338, 341, 345, 350
See application file for complete search history.

(56) References Cited

OTHER PUBLICATIONS

3GPP, "ETSI TS 138 331 V15.3.0", 5G; NR; Radio Resource Control (RRC); Protocol specification (3GPP TS 38.331 version 15.3.0 Release 15), ETSI, Oct. 2018, pp. 1-441.
Ericsson, "RAT dependent NR positioning solutions", 3GPP TSG-RAN WG1 #95, R1-1813592, Spokane, United States, Nov. 12-16, 2018, pp. 1-17.
Ericsson, "RAT dependent NR positioning solutions", 3GPP TSG-RAN WG1 #94b, R1-1811530, Chengdu, P.R. China, Oct. 8-12, 2018, pp. 1-12.

* cited by examiner

METHODS, APPARATUS AND MACHINE-READABLE MEDIUMS RELATING TO REFERENCE SIGNALS FOR POSITIONING IN A WIRELESS NETWORK

TECHNICAL FIELD

Embodiments of the present disclosure relate to wireless networks, and particularly to methods, apparatus and machine-readable mediums relating to reference signals for positioning in a wireless network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Positioning has been a topic in Long Term Evolution (LTE) standardization since $3^{rd}$ Generation Partnership Project (3GPP) Release 9. The primary objective is to fulfill regulatory requirements for emergency call positioning; however, other functions and services may require the position of a wireless device to be determined. Positioning in New Radio (NR) is proposed to be supported by the architecture shown in FIG. 1. The Location Management Function (LMF) is the location server in NR. There are also interactions between the location server and the gNodeB via the NRPPa protocol. The interactions between the gNodeB and the device are supported via the Radio Resource Control (RRC) protocol.

FIG. 1 shows the NG-RAN Rel-15 Location Services (LCS) Protocols. The gNB and ng-eNB may not always both be present. When both the gNB and ng-eNB are present, the NG-C interface is only present for one of them.

In the legacy LTE standards, the following techniques are supported:

Enhanced Cell ID. Essentially cell ID information to associate the device to the serving area of a serving cell, and then additional information to determine a finer granularity position.

Assisted Global Navigation Satellite System (GNSS). GNSS information retrieved by the device, supported by assistance information provided to the device from Evolved-Serving Mobile Location Centre (E-SMLC)

OTDOA (Observed Time Difference of Arrival). The device estimates the time difference of reference signals from different base stations and sends to the E-SMLC for multilateration.

UTDOA (Uplink TDOA). The device is requested to transmit a specific waveform that is detected by multiple location measurement units (e.g. an eNB) at known positions. These measurements are forwarded to E-SMLC for multilateration According to the NR positioning study item agreed for Re1.16, the 3GPP NR radio-technology is uniquely positioned to provide added value in terms of enhanced location capabilities. The operation in low and high frequency bands (i.e. below and above 6 GHz) and utilization of massive antenna arrays provide additional degrees of freedom to substantially improve the positioning accuracy. The possibility to use wide signal bandwidth in low and especially in high bands brings new performance bounds for user location for well-known positioning techniques based on OTDOA and UTDOA, Cell-ID or E-Cell-ID etc., utilizing timing measurements to locate the UE. The recent advances in massive antenna systems (massive MIMO) can provide additional degrees of freedom to enable more accurate user location by exploiting spatial and angular domains of propagation channel on their own or in combination with time measurements.

With 3GPP Release 9, Positioning Reference Signals (PRS) have been introduced for antenna port 6 as an alternative to the Release 8 cell-specific reference signals for positioning measurements of relative time differences between signals from different base stations. One reason is that the required high probability of detection can be better supported with the dedicated PRS. A neighbor cell with its synchronization signals (Primary-/Secondary Synchronization Signals) and reference signals is seen as detectable when the Signal-to-Interference-and-Noise Ratio (SINR) is at least −6 dB. Simulations during standardization have shown that this can only be guaranteed for 70% of all cases for the 3rd best-detected cell (i.e., the 2nd best neighboring cell). This is not enough and has been assumed in an interference-free environment, which cannot be ensured in a real-world scenario. However, PRS have some similarities with cell-specific reference signals as defined in 3GPP Release 8. It is a pseudo-random QPSK sequence that is mapped in diagonal patterns with shifts in frequency and time to avoid collision with cell-specific reference signals and an overlap with the control channels (PDCCH).

The LTE standard PRS provide three layers of isolation to improve hearability (i.e., the ability to detect weak neighbour cells):

1. Code domain: Each cell transmits a different PRS sequence (orthogonal to other PRS sequences in the code domain).
2. Frequency domain: PRS has a frequency re-use of six, i.e., six possible frequency arrangements (called frequency offset) are defined within the PRS bandwidth. If two cells have the same frequency offset, the PRSs collide in the frequency domain. In such cases, the isolation from the orthogonal PRS sequences distinguishes one cell from the other.
3. Time domain: If PRSs collide in the frequency domain, muting (time-based blanking) is used to avoid interference from cells transmitting PRS with the same frequency shift by ensuring that the interfering PRS and the victim PRS are not transmitted in time-overlapping PRS occasions.

In NR, the CSI RS for tracking (also referred to as the tracking reference signal (TRS)) comes in periodic bursts consisting of one or two slots (see FIG. 2). Both burst periodicity and slot offset may be configurable, e.g., through the RRC parameter CSI-ResourcePeriodicityAndOffset.

FIG. 2 shows a TRS design in the time domain. In the time domain two symbols that are four symbols apart are used in each slot of the TRS burst. At low frequencies three different symbol pair positions are allowed, giving three orthogonal patterns in time. At high frequencies all symbol positions are allowed; this allows for a maximum of six different symbol pair positions. In practice that number is often limited further to a maximum of five symbol positions in order to avoid overlap with the Control Resource Set (CORESET)—a region where control information is provided.

FIG. 3 shows a TRS design in a frequency/time domain. In the frequency domain the TRS has a comb 4 structure. This means that frequency shifts give four orthogonal patterns in the frequency domain. In total that gives 4*3=12 orthogonal patterns (see FIG. 3). At high frequencies all time shifts are allowed which in principle should allow six TRS's in a slot, but since the first slot is used for control it is typically only possible to accommodate five TRSs (depending on the bandwidth and CORESET positions).

There currently exist certain challenge(s).

CSI-RS has the potential to be used for positioning as a suitable downlink reference signal (e.g., for timing measurements). However, CSI-RS has been used primarily for mobility purpose and configurations are restricted to the serving cell and the specific purpose of channel state information measurements. Therefore, no positioning-related signaling or configuration exists that enables the use of CSI-RS for positioning.

SUMMARY

Certain aspects of the present disclosure and their embodiments may provide solutions to these or other challenges.

In one aspect, a method performed by a wireless device is provided. The method relates to positioning in a wireless network. The method comprises receiving user data, and a reference signal for positioning in a transmission from a radio network node. The method further comprises rate matching the user data over one or more radio resources not used by the reference signal.

In another aspect, a wireless device is provided. The wireless device comprises power supply circuitry configured to supply power to the wireless device, and processing circuitry. The processing circuitry is configured to receive user data and a reference signal for positioning in a transmission from a radio network node. The processing circuitry is further configured to rate match the user data over one or more radio resources not used by the reference signal.

In a further aspect, the disclosure defines, from a network perspective, the CSI configuration information signaling. This may comprise identifying the CSI-RS configuration parameters, preparing the message and providing them to the UE in positioning Assistance Data—see FIG. 8 below. The network node may also in some examples obtain the UE positioning capability related to CSI-RS configurations and measurements (e.g., determine based on requirements or pre-defined rules or receive (in an unsolicited way or upon its request from the UE or its serving BS) and adapt the configuration for CSI-RS to the UE capability or at least provide the configuration for CSI-RS for UE supporting positioning (e.g., OTDOA or E-CID) based on CSI-RS.

From a wireless device perspective, one further aspect provides a method of obtaining the CSI-RS configuration as part of the positioning assistance data. The UE performs time of arrival measurements based upon the configuration that is provided in the positioning assistance data. Based on the time of arrival measurements, the UE determines the relative time difference between pairs of reference signals—see FIG. 4. The UE may also in some examples provide (in an unsolicited way or upon a request from the network node) the UE positioning (e.g., OTDOA or E-CID) capability related to CSI-RS.

From a radio network node perspective (e.g., a base station or a beacon-like device transmitting signals for positioning), one further aspect provides a method in which the configuration of the CSI-RS resource set or the CSI-RS resource(s) for positioning is determined, the CSI-RS resource set or the CSI-RS resource(s) are transmitted accordingly, and the CSI-RS configuration is provided to the Location Server (e.g., via LPPa/NPPa). To support this, the radio network node may also obtain the capability for positioning based on CSI-RS resource sets or CSI-RS resource(s) for one, some, or all UEs (e.g., for a specific release UE). The capability can be used for adapting the CSI-RS configuration in the radio network node. The obtaining may comprise determining based on a pre-defined rule or a requirement or receiving from the UE (in an unsolicited way or upon the radio network node's request). The obtained UE capability may also be sent to the Location Server (in an unsolicited way or upon the Location Servers request).

There are, proposed herein, various embodiments which address one or more of the issues disclosed herein.

Certain embodiments may provide one or more technical advantage(s) by providing the signalling needed to use CSI-RS for positioning.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
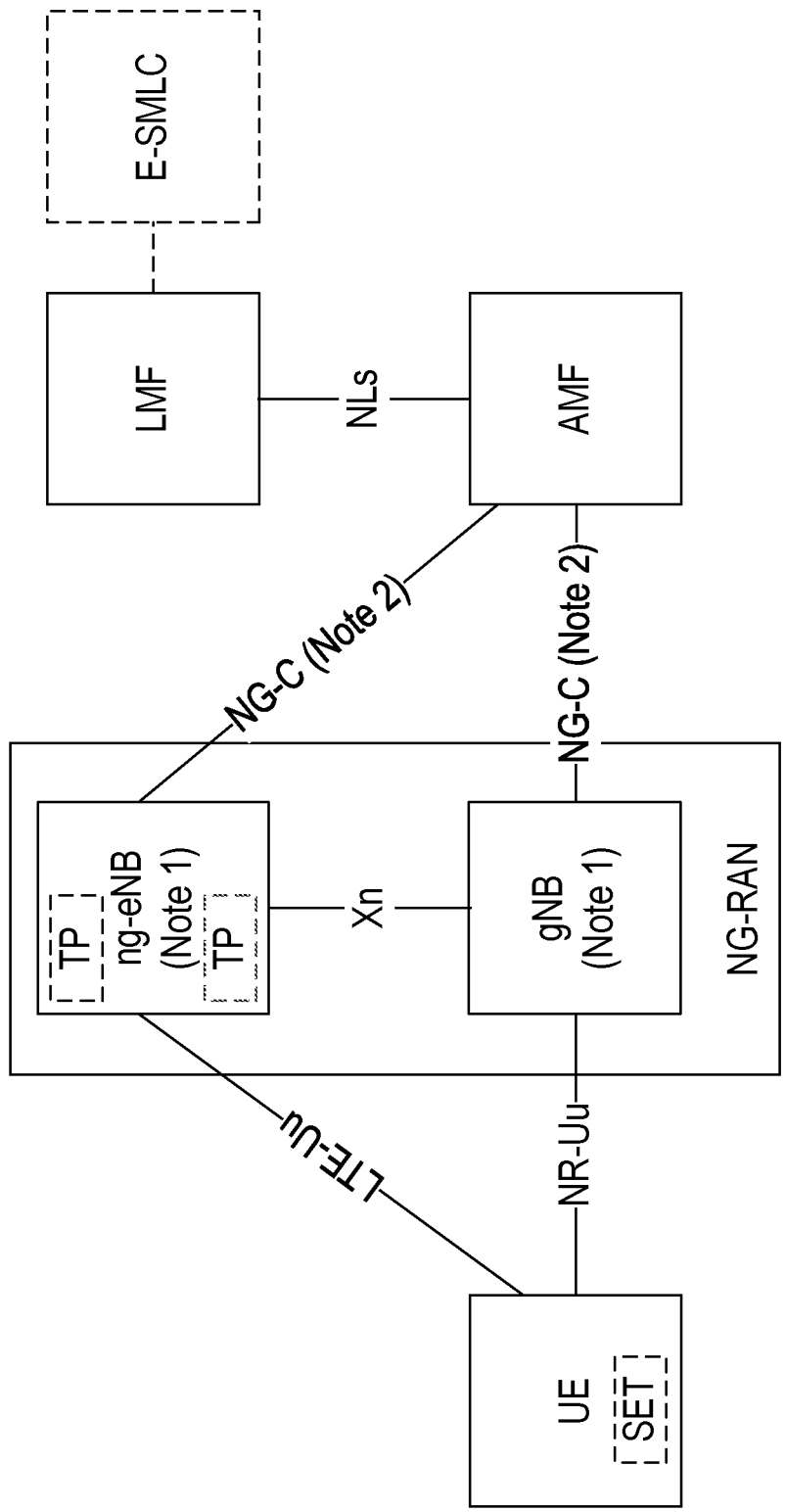
FIG. 1 shows an illustration of a positioning architecture applicable to NG-RAN.
Figure 2:
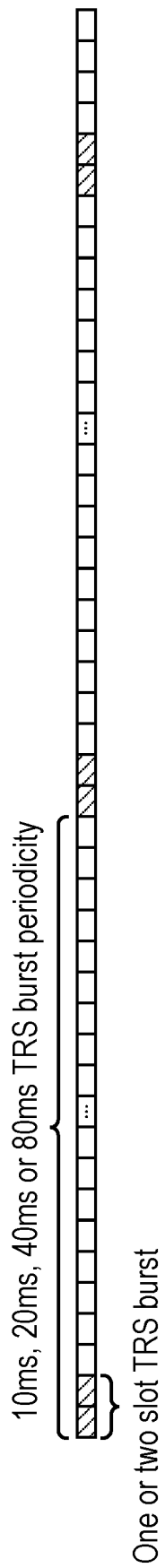
FIG. 2 shows an illustration of a tracking reference signal (TRS) design in the time domain.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Further information relating to embodiments of the disclosure may be found in the Appendix.

Embodiments of the present disclosure provide signaling to allow for accurate measurements of NR reference signals for positioning such as Time of Arrival (TOA) and Reference Signal Time Difference (RSTD), and to configure wireless devices to perform such measurements.

For each measurement the wireless device is configured to perform (such as TOA estimation and/or other positioning related measurements), the wireless device is configured with information on the reference signal or set of reference signals it shall use for the measurement. For example, where the measurement relates to TOA estimation, each TOA estimate or measurement may correspond to the time of arrival of a signal transmitted from a certain transmission point or the time of arrival of a signal transmitted from a certain transmission point in a specific beam. In this disclosure we provide configuration signaling mechanisms which provide this information where, for example, the reference signal or set of reference signals to use is one of the following alternatives A CSI-RS resource set (as defined in TS 38.331, v 15.3.0)
    A CSI-RS resource (as defined in TS 38.331, v 15.3.0)
    A number of CSI-RS resources
    A combination of any of the above signals together with additional reference signals.

The embodiments below refer to CSI-RS information or configuration. This can refer to information defining one of the following alternatives A CSI-RS resource set (as defined in TS 38.331, v 15.3.0)
    A CSI-RS resource (as defined in TS 38.331, v 15.3.0)
    A number of CSI-RS resources The disclosure provides embodiments in a wireless device, a radio network node (such as a base station), and a network node (such as a positioning network node or location server). In particular embodiments, the radio network node provides to the network node an indication of a CSI-RS configuration used by the radio network node. The network node may receive respective CSI-RS configurations from multiple radio network nodes. The network node further initiates transmission of a configuration message to the wireless device, comprising an indication of the CSI-RS configurations used by one or more radio network nodes. The wireless device thus receives the configuration message, and is able to perform positioning measurements on CSI-RS transmissions by the one or more radio network nodes, based on the respective CSI-RS configurations.

In further embodiments, the wireless device may report to the network node its capabilities of performing positioning measurements on CSI-RS transmissions by radio network nodes. The configuration message may be formulated based on the capability of the wireless device (e.g., tailored or adapted to suit the capability of the wireless device). For example, the CSI-RS configurations indicated in the configuration message may comprise only CSI-RS parameters which are relevant for measurements which the wireless device is capable of performing, or CSI-RS configurations used by radio network nodes which the wireless device is capable of measuring.

Further detail concerning these embodiments is described below in FIGS. 4, 6 and 8, which describe inter-related methods in a wireless device, a radio network node, and a network node.

Figure 4:
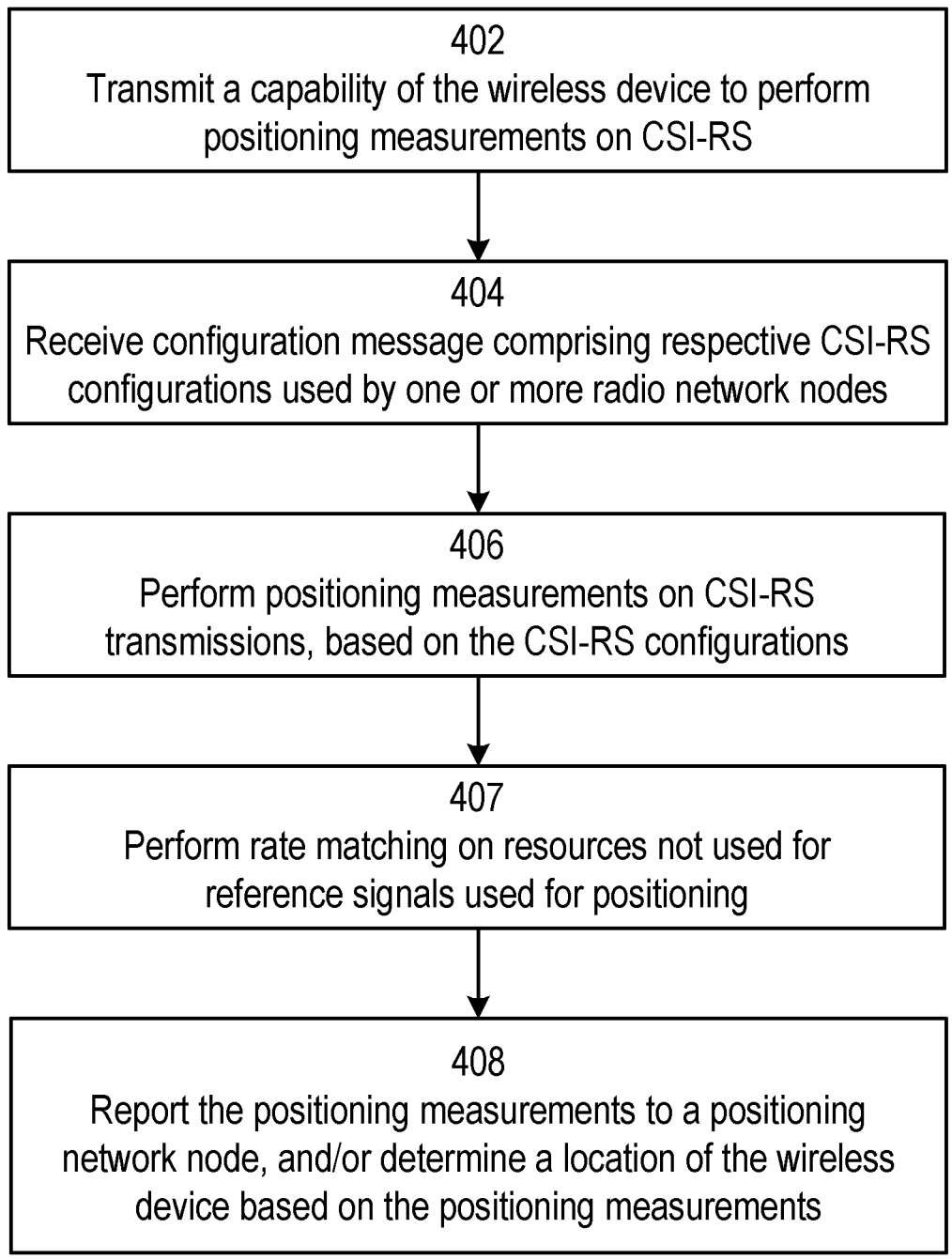
FIG. 4 is a flowchart of a method according to embodiments of the disclosure.

FIG. 4 depicts a method in accordance with particular embodiments, which may be performed by or implemented in a wireless device (such as the wireless device 1010 or the UE 1100 described below).

The method begins at step 402, in which the wireless device transmits an indication of its capability to perform positioning measurements on CSI-RS transmissions. The capability may be transmitted directly or indirectly towards a network node such as a positioning network node or a location server (e.g., LMF described above in FIG. 1). When transmitted indirectly, the capability may be transmitted via a radio network node (such as a serving network node, e.g., network node 1060) which then forwards or provides the capability to the network node. The capability may be provided in an unsolicited way (e.g., periodically reported) or upon a request from the network node.

The capability related to positioning based on CSI-RS may or may not be signaled by the wireless device. In the latter case, the network node may determine the UE capability based on a pre-defined rule or requirements. In either embodiment, the location server obtains or determines the UE capability and can use it for creating CSI-RS configuration data (e.g., as positioning assistance data) for the UE.

The capability may comprise one or more of the UE ability to support for positioning purpose (e.g., OTDOA or E-CID):

CSI-RS based signal strength or quality measurements (e.g., RSRP/RSRQ/SINR-like measurements)
    CSI-RS based timing measurements (e.g., TDOA, TOA, RTT, Rx-Tx, etc.)
    CSI-RS angular measurements (e.g., angle of arrival)
    CSI-RS based intra-frequency measurements
    CSI-RS based measurements for PCell
    CSI-RS based measurements for PSCell
    CSI-RS based measurements for one or more SCells
    CSI-RS based measurements for intra-frequency neighbor cells
    CSI-RS based inter-frequency measurements
    CSI-RS based measurements in a specific part of the frequency spectrum (e.g., FR1 and/or FR2)
    CSI-RS based measurements with a specific configuration (e.g., bandwidth not smaller than a threshold, density not smaller than a threshold, periodicity not smaller than a threshold)
    CSI-RS based intra-frequency measurement with measurement gaps
    CSI-RS based intra-frequency measurements outside active DL bandwidth part (BWP)
    measurements on CSI-RS with specific QCL properties and/or TCI-state (e.g., having a specific QCL type with some channel; quasi co-located with a specific CORESET; not quasi co-located with any CORESET or a specific CORESET, etc.)
    CSI-RS based measurements based on minimum UE requirements for such measurements (e.g., minimum bandwidth and/or minimum density, minimum number of consecutive slots or subframes, periodicity below a threshold, lowest Es/Iot which may impact the transmit power or imply a certain interference coordination or muting patterns, QCL and/or TCI-state property, minimum synchronization requirement or maximum time misalignment with a reference timing, etc.)

CSI-RS based measurements with a certain relation to SMTC configuration of the same cell (e.g., CSI-RS within or outside the subframes comprised in SMTC)

CSI-RS based measurements based on a certain numerology (e.g., same or different numerology of SSB of the same cell).

The CSI-RS configuration relates to one or more CSI-RS resources utilized by the one or more radio network nodes. For example, the one or more CSI-RS resources may comprise a CSI-RS resource set, such as a CSI-RS resource set comprising one or more of an information element TRS-info set and a CSI-RS for tracking (also referred to as a tracking reference signal, TRS).

In step 404, the wireless device receives a configuration message comprising respective CSI-RS configurations used by one or more radio network nodes. The configuration message may comprise an LTE Positioning Protocol (LPP) message or a NR Positioning Protocol (NPP) message, for example. Alternatively the configuration message may be transmitted via a different message, such as via RRC signalling. The configuration message may be received directly from a network node such as a positioning network node or a location server (e.g., the LMF described above), or indirectly from a network node via a radio network node (e.g., a serving base station).

The one or more radio network nodes for which CSI-RS configurations are provided may comprise one or more of: a serving radio network node, a reference network node (which may be the serving radio network node), and one or more neighbouring network nodes. For example, the CSI-RS configurations may be provided within assistance data provided by the network node for the purposes of positioning. The CSI-RS configurations may be utilized for the cells served by those radio network nodes, or for one or more beams transmitted by those radio network nodes (e.g., where different transmission beams utilize different CSI-RS configurations).

In one embodiment the reference cell information and neighbor cell information are updated such that CSI-RS configurations are provided. One example is shown below where the reference cell information is updated to include the CSI-RS configuration. Corresponding adjustments can be made for the neighbour cells as well.

```
-- ASN1START
OTDOA-ReferenceCellInfo ::= SEQUENCE {
    physCellId                  INTEGER (0..503),
    cellGlobalId                ECGI                            OPTIONAL,    -- Need ON
    earfcnRef                   ARFCN-ValueEUTRA                OPTIONAL,    -- Cond
NotSameAsServ0
    antennaPortConfig           ENUMERATED {ports1-or-2, ports4, ... }
                                                                OPTIONAL,    -- Cond
NotSameAsServ1
    cpLength                    ENUMERATED { normal, extended, ... },
    prsInfo                     PRS-Info                        OPTIONAL,    -- Cond
PRS
    ...,
    [[ earfcnRef-v9a0           ARFCN-ValueEUTRA-v9a0           OPTIONAL     -- Cond
NotSameAsServ2
    ]],
    [[ tpId-r14                 INTEGER (0..4095)               OPTIONAL,    -- Need ON
        cpLengthCRS-r14         ENUMERATED { normal, extended, ... }
                                                                OPTIONAL,    -- Cond
CRS
        sameMBS FNconfigRef-r14  BOOLEAN                        OPTIONAL,    -- Need ON
        dlBandwidth-r14         ENUMERATED {n6, n15, n25, n50, n75, n100}
                                                                OPTIONAL,    -- Cond
NotSameAsServ3
        addPRSconfigRef-r14     SEQUENCE (SIZE (1..maxAddPRSconfig-r14)) OF PRS-Info
                                                                OPTIONAL     -- Need ON
    ]],
    [[
        nr-LTE-SFN-Offset-r15   INTEGER (0..1023)               OPTIONAL     -- Cond NR
    ]],
    [[
        csi-rs-Info-r16         CSI-RS-Info-r16                 OPTIONAL,    -- Cond NR
    ]]
}
maxAddPRSconfig-r14    INTEGER ::= 2
-- ASN1STOP
```

Alternatively, a separate definition for the NR reference and neighbor cells is considered. The following example utilizes a LPP format.

```
-- ASN1START
OTDOA-NR-ReferenceCellInfo ::= SEQUENCE {
    physCellId          INTEGER (0..1007)    OPTIONAL,
    cellGlobalId        NR-ECGI              OPTIONAL,  -- Need ON
    csi-rs-Info-r16     CSI-RS-Info-r16      OPTIONAL,
    earfcnRef           ARFCN-ValueNR        OPTIONAL,
                                             -- Cond NotSameAsServ0
    antennaPortConfig   ENUMERATED {ports1-or-2, ports4, ... }
                                             OPTIONAL,
                                             -- Cond NotSameAsServ1
    cpLength            ENUMERATED { normal, extended, ... },
    prsInfo             PRS-Info             OPTIONAL, -- Cond
PRS
}
-- ASN1STOP
```

Note that the NR physical cell ID (physCellId) is optional, which enables the configuration of positioning assistance data independent of the PCI. Therefore, an identEfier associated with the reference cell may not be cell specific. Therefore, the terms 'reference cell' and 'neighbor cell' can be replaced by identifiers which are cell agnostic, such as node or anchor. In one embodiment, the reference is one transmission reception point (TRP), while the neighbors are other TRPs all associated to the same cell.

The CSI-RS configuration for each radio network node may comprise one or more of the following parameters:

- index or identity used to generate CSI-RS sequence and distinguish between different beams
- Numerology (e.g., subcarrier spacing, cyclic prefix (CP), etc.)
- Bandwidth (e.g., in the number of physical radio resource blocks (PRBs)—note that the size of PRB depends on the numerology)
  Note that the bandwidth may also be adapted for the UE, depending on its radio conditions and/or CSI-RS density, e.g., based on other measurements received from the UE, UE approximate location, UE best beam, other CSI-RS configuration parameters, etc.—a larger bandwidth may be configured for UE in worse radio conditions and/or with less dense CSI-RS subframes or slots carrying CSI-RS
  Note that the number of consecutive subframes or slots with CSI-RS may also be adapted for the UE, depending on its radio conditions, e.g., based on other measurements received from the UE, UE approximate location, UE best beam, other CSI-RS configuration parameters, etc.—more subframes may be configured for UE in worse radio conditions and/or with a smaller bandwidth Transmit power indication
  Note that the transmit power may be adapted for the UE, depending on its radio conditions and/or other CSI-RS parameters such as density or bandwidth, e.g., based on other measurements received from the UE, UE approximate location, UE best beam, other CSI-RS configuration parameters, etc.—a higher power may be configured for UE in worse radio conditions or small bandwidth or less dense CSI-RS or fewer CSI-RS subframes
- Density (e.g., a number of CSI-RS resources used per radio resource, such as a number of resource elements carrying CSI-RS per slot or subframe)
  Note that density may also be adapted for the UE, depending on its radio conditions and/or bandwidth or number of CSI-RS subframes, e.g., based on other measurements received from the UE, UE approximate location, UE best beam, other CSI-RS configuration parameters, etc.—higher density may be configured for UE in worse radio conditions and/or with a smaller bandwidth
- Quasi co-located (QCL) or transmission configuration indication (TCI)-state property indication (e.g., for the serving cell)
- Implicit or explicit radio network node's transmit beam or transmit direction with CSI-RS, to allow the UE to adaptively configure its receiver and in some examples to avoid or minimize the need for UE receive beam sweeping
  Note also that fewer directions (than actually transmitted by the BS) may be relevant for the UE and thus included in the assistance data for the UE, e.g., based on UE serving cell ID, best beam, UE approximate location, etc.—this selection may be done by the Location Server providing the positioning assistance data to the UE and/or by the radio network node providing the UE-specific CSI-RS configuration to the Location Server
- Carrier frequency (e.g., a frequency within a frequency band, frequency band, frequency range, etc.)
- Frequency hopping configuration (e.g., hopping pattern, offset, periodicity, repetition, etc.)
- Muting configuration (e.g., muting pattern based on bit string)
- An indication whether the CSI-RS configuration of the current cell and/or beam is the same or different from a reference CSI-RS configuration (e.g., in the serving cell or reference cell and/or beam)—this is useful to reduce the signaling overhead and avoid duplicate signaling for different cells For example, the number of consecutive subframes can be N1 for BW1 with density1 (e.g., N1=2, BW1=96 PRBs, density1=density level 3) and N2 for BW2 with density2 (e.g., N1=6, BW1=48 PRBs, density1=density level 3) for Es/Iot>=−3 dB. In another example, N3 for BW3 with density3 (e.g., N3=6, BW3=96 PRBs, density3=density level 3) and N4 for BW4 with density4 (e.g., N4=12, BW4=48 PRBs, density4=density level 3) for Es/Iot>=−6 dB. That is, a first set of parameters is used for a first coverage level and a second set of parameters is used for a second coverage level.

In NR positioning, the CSI-RS configuration may be for a serving cell, a reference cell, or one or more neighbor cells. The CSI-RS configuration communicated from a base station to the location server may be non-UE specific for one or more cells associated with the radio network node or it may be UE specific (for one or more serving cells and one or more best beams of the UE).

An example CSI-RS configuration for NR positioning is as follows:

```
-- ASN1START
CSI-RS-Info-r16 ::= SEQUENCE { csi-rs-MeasurementBW SEQUENCE {
    nrofPRBs            ENUMERATED { size24, size48, size96, size192, size264},
    startPRB            INTEGER(0..2169),
    },
    csi-RS-Index        CSI-RS-Index,
    slotConfig          CHOICE {
        ms4             INTEGER (0..31),
        ms5             INTEGER (0..39),
        ms10            INTEGER (0..79),
        ms20            INTEGER (0..159),
        ms40            INTEGER (0..319)
    }
    resourceMapping     CSI-RS-ResourceMapping,
    csi-rs-OccGroupLen  ENUMERATED {g2, g4, g8, g16, g32, g64, g128,...
}
    csi-rs-MutingInfo   CHOICE {
        po2-r9          BIT STRING (SIZE (2)),
        po4-r9          BIT STRING (SIZE (4)),
        po8-r9          BIT STRING (SIZE(8)),
        po16-r9         BIT STRING (SIZE(16)),
        ...,
    }
}
CSI-RS-Index ::= INTEGER (0..maxNrofCSI-RS-ResourcesPositioning-1)
```

| CSI-RS-Info field descriptions |
|---|
| nrofPRBs<br>Allowed size of the measurement BW in PRBs Corresponds to L1 parameter 'CSI-RS-measurementBW-size' (see FFS_Spec, section FFS_Section).<br>startPRB<br>Starting PRB index of the measurement bandwidth Corresponds to L1 parameter 'CSI-RS-measurement-BW-start' (see FFS_Spec, section FFS_Section) FFS_Value: Upper edge of value range unclear in RAN1.<br>csi-RS-Index<br>CSI-RS resource index associated to the CSI-RS resource to be measured (and used for reporting).<br>resourceMapping<br>OFDM symbol and subcarrier occupancy of the ZP-CSI-RS resource within a slot<br>slotConfig<br>Indicates the CSI-RS periodicity (in milliseconds) and for each periodicity the offset (in number of slots). When subcarrierSpacingCSI-RS is set to 15 kHZ, the maximum offset values for periodicities ms4/ms5/ms10/ms20/ms40 are 3/4/9/19/39 slots. When subcarrierSpacingCSI-RS is set to 30 kHZ, the maximum offset values for periodicities ms4/ms5/ms10/ms20/ms40 are 7/9/19/39/79 slots. When subcarrierSpacingCSI-RS is set to 60 kHZ, the maximum offset values for periodicities ms4/ms5/ms10/ms20/ms40 are 15/19/39/79/159 slots. When subcarrierSpacingCSI-RS is set 120 kHZ, the maximum offset values for periodicities ms4/ms5/ms10/ms20/ms40 are 31/39/79/159/319 slots.<br>csi-rs-muting<br>This field specifies the csi-rs muting configuration of the cell or beam. If a bit in the CSI-RS muting sequence is set to "0", then no CSI-RS is transmitted in all the CSI-RS occasions in the corresponding CSI-RS occasion group. A CSI-RS occasion group comprises one or more CSI-RS occasions as indicated by CSI-RSOccGroupLen.<br>csi-RS-OccGroupLen<br>This field specifies the CSI-RS occasion group length, defined as the number of consecutive CSI-RS occasions comprising a CSI-RS occasion group. Each CSI-RS occasion of the PRS occasion group consists of periodicity defined by slotConfig. Enumerated values define 2, 4, 8 and 16 consecutive CSI-RS occasions. If omitted, the CSI-RS occasion group length is 1. |

The information element CSI-RS-ResourceMapping may be used to configure the resource element mapping of a CSI-RS resource in time- and frequency domain. See, for example 3GPP TS 38.331, v 15.3.0.

```
-- ASN1START
-- TAG-CSI-RS-RESOURCEMAPPING-START
CSI-RS-ResourceMapping ::=       SEQUENCE {
    frequencyDomainAllocation    CHOICE {
        row1                     BIT STRING (SIZE (4)),
        row2                     BIT STRING (SIZE (12)),
        row4                     BIT STRING (SIZE (3)),
        other                    BIT STRING (SIZE (6))
    },
    nrofPorts                    ENUMERATED {p1,p2,p4,p8,p12,p16,p24,p32},
```

```
        firstOFDMSymbolInTimeDomain      INTEGER (0..13),
        firstOFDMSymbolInTimeDomain2          INTEGER (2..12)
OPTIONAL, -- Need R
        cdm-Type                         ENUMERATED {noCDM, fd-CDM2, cdm4-FD2-TD2, cdm8-
FD2-TD4},
        density                          CHOICE {
            dot5                              ENUMERATED {evenPRBs, oddPRBs},
            one                               NULL,
            three                             NULL,
            spare                             NULL
        },
        freqBand                         CSI-FrequencyOccupation,
        ...
}
-- TAG-CSI-RS-RESOURCEMAPPING-STOP
-- ASN1STOP
```

In step 406, the wireless device performs positioning measurements on CSI-RS transmissions by the one or more radio network nodes, based on the CSI-RS configurations received in step 404. For example, the positioning measurements may comprise timing measurements such as one or more of time-of-arrival (TOA) measurements and reference signal time difference (RSTD) measurements. Alternatively, the measurement may comprise directional measurements such as angle-of-arrival measurements, pathloss (which may be used to determine distance), etc.

In step 407, the wireless device performs rate-matching of user data received in the same subframe as a CSI-RS transmission (e.g., from a serving radio network node). Thus, when CSI-RS is configured for positioning using TRS it may happen that data and TRS exist in the same subframe. To better utilize the resources, it is good to occupy the frequency-time resource grid as much as possible. Additionally in such case, when data and TRS exists, it should also be still be possible to mute the TRS.

In one embodiment, where the wireless device is scheduled for downlink data reception (e.g., via PDSCH) in a slot where it has also been configured with a reference signal for positioning, the wireless device rate matches around the resource elements used by the reference signal for positioning, i.e. the wireless device receives data only on the resource elements not used by the reference signal for positioning and adapts the data decoding accordingly.

In another embodiment, a wireless device which is scheduled for downlink data reception (e.g., via PDSCH) in a slot where it has also been configured with a reference signal for positioning, rate matches around the symbols used by the reference signal for positioning, i.e. the wireless device receives data only on the symbols not used by the reference signal for positioning and adapts the data decoding accordingly.

In yet another embodiment the wireless device rate matches (e.g., as described above) around either resource elements or around symbols based on received higher layer signaling.

The reference signal for positioning may refer to a CSI-RS resource set or CSI-RS-resource(s) e.g. as configured based on mechanisms described in this IVD. It may also refer to a different reference signal for positioning. The reference signal may be of a configured, non-zero power level, or instead configured to be zero powered (e.g. muted) for interference measurement or other purpose.

In step 408, the wireless device utilizes the measurements to determine its location (e.g., its geographical position). For example, the wireless device may calculate its location directly, based on the measurements performed in step 406. Alternatively, the wireless device may report the measurements performed in step 406 to a network node such as a positioning network node or a location server (e.g., the LMF), enabling the network node to determine the location of the wireless device.

Figure 5:
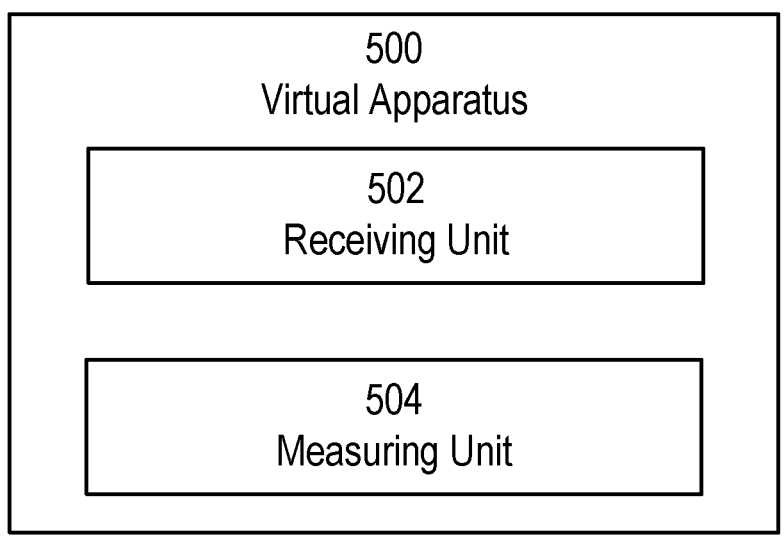
FIG. 5 shows a virtualization apparatus according to embodiments of the disclosure.
Figure 10:
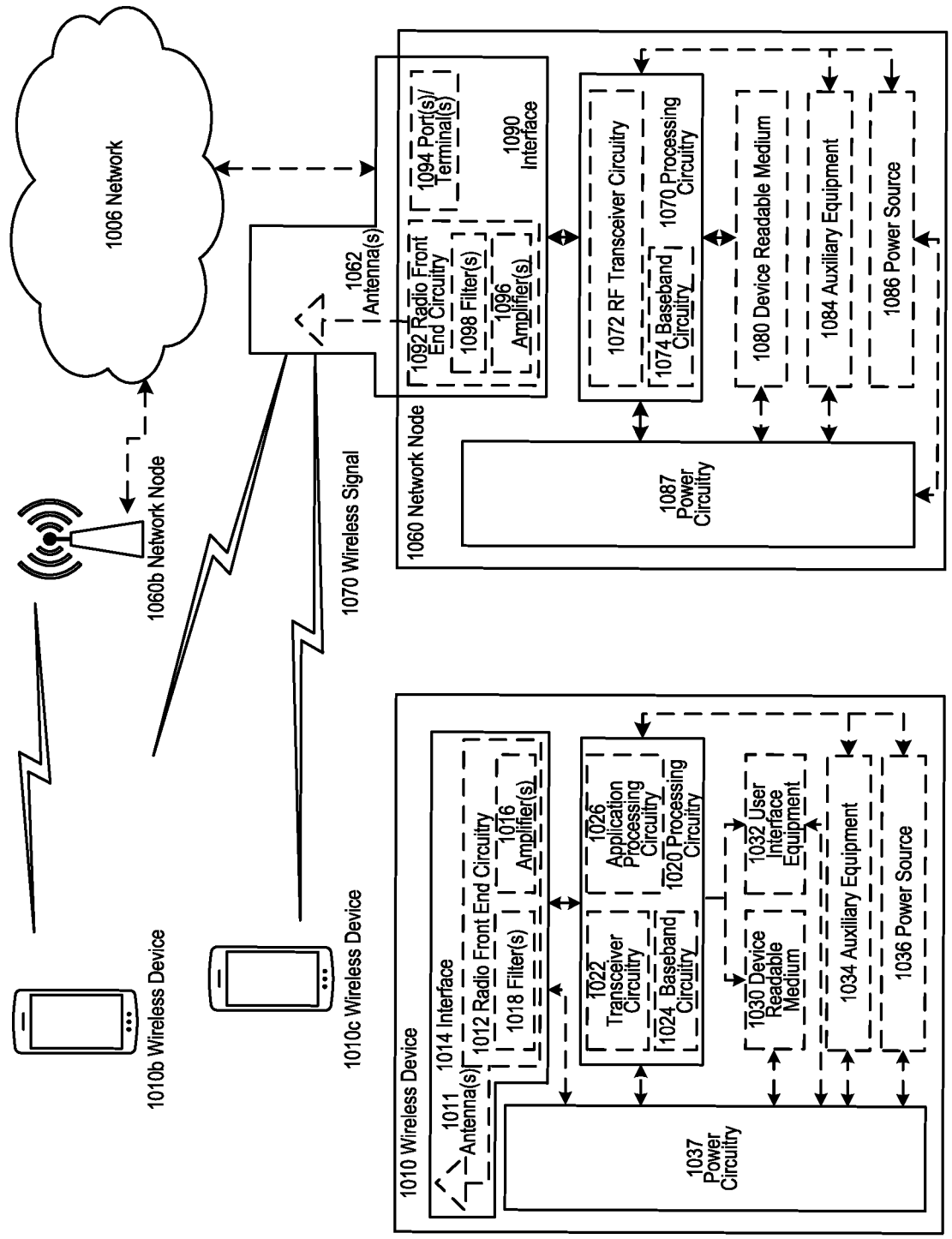
FIG. 10 shows a wireless network according to embodiments of the disclosure.

FIG. 5 illustrates a schematic block diagram of an apparatus 500 in a wireless network (for example, the wireless network shown in FIG. 10). The apparatus may be implemented in a wireless device (e.g., wireless device 1010 shown in FIG. 10 or user equipment 1100). Apparatus 500 is operable to carry out the example method described with reference to FIG. 4 and possibly any other processes or methods disclosed herein. It is also to be understood that the method of FIG. 4 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 502 and measuring unit 504, and any other suitable units of apparatus 500 to perform corresponding functions according one or more embodiments of the present disclosure.

As illustrated in FIG. 5, apparatus 500 includes receiving unit 502 and measuring unit 504. Receiving unit 502 is configured to receive, from a network node, a configuration message comprising an indication of respective channel-state-information reference signal (CSI-RS) configurations utilized by one or more radio network nodes of the wireless network. Measuring unit 504 is configured to perform positioning measurements on CSI-RS transmissions by the one or more radio network nodes, based on the respective CSI-RS configurations.

Figure 6:
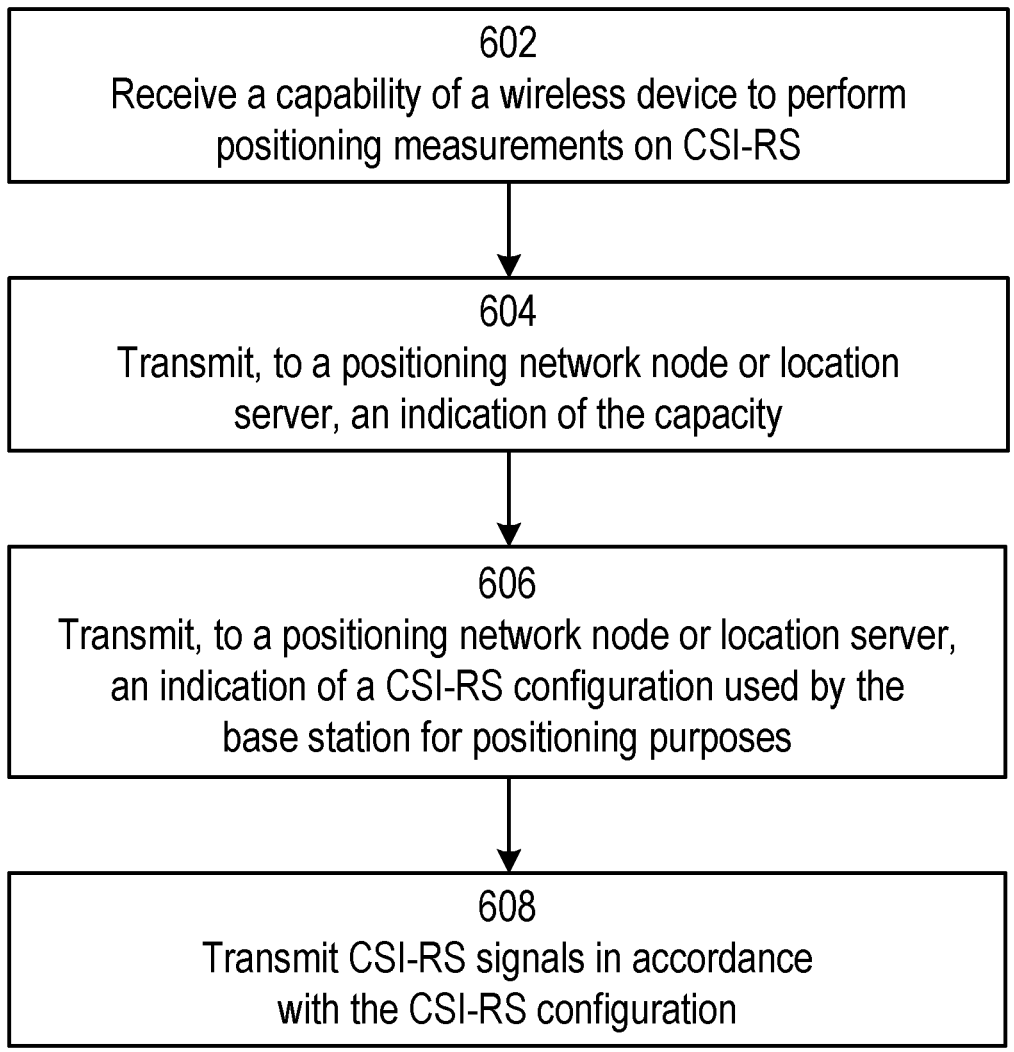
FIG. 6 is a flowchart of a method according to embodiments of the disclosure.

FIG. 6 depicts a method in accordance with particular embodiments, which may be performed by or implemented in a radio network node or base station (such as the network node 1060 described below).

The method begins at step 602, in which the radio network node receives, from a wireless device, an indication of a capability of the wireless device to perform positioning measurements on CSI-RS transmissions.

The capability related to positioning based on CSI-RS may or may not be signaled by the wireless device. In the latter case, the network node may determine the UE capability based on a pre-defined rule or requirements. In either embodiment, the location server obtains or determines the UE capability and can use it for creating CSI-RS configuration data (e.g., as positioning assistance data) for the UE.

The capability may comprise one or more of the UE ability to support for positioning purpose (e.g., OTDOA or E-CID):

- CSI-RS based signal strength or quality measurements (e.g., RSRP/RSRQ/SINR-like measurements)
- CSI-RS based timing measurements (e.g., TDOA, TOA, RTT, Rx-Tx, etc.)
- CSI-RS angular measurements (e.g., angle of arrival)
- CSI-RS based intra-frequency measurements
- CSI-RS based measurements for PCell
- CSI-RS based measurements for PSCell
- CSI-RS based measurements for one or more SCells
- CSI-RS based measurements for intra-frequency neighbor cells
- CSI-RS based inter-frequency measurements
- CSI-RS based measurements in a specific part of the frequency spectrum (e.g., FR1 and/or FR2)
- CSI-RS based measurements with a specific configuration (e.g., bandwidth not smaller than a threshold, density not smaller than a threshold, periodicity not smaller than a threshold)
- CSI-RS based intra-frequency measurement with measurement gaps
- CSI-RS based intra-frequency measurements outside active DL bandwidth part (BWP)
- measurements on CSI-RS with specific QCL properties and/or TCI-state (e.g., having a specific QCL type with some channel; quasi co-located with a specific CORESET; not quasi co-located with any CORESET or a specific CORESET, etc.)
- CSI-RS based measurements based on minimum UE requirements for such measurements (e.g., minimum bandwidth and/or minimum density, minimum number of consecutive slots or subframes, periodicity below a threshold, lowest Es/Iot which may impact the transmit power or imply a certain interference coordination or muting patterns, QCL and/or TCI-state property, minimum synchronization requirement or maximum time misalignment with a reference timing, etc.)
- CSI-RS based measurements with a certain relation to SMTC configuration of the same cell (e.g., CSI-RS within or outside the subframes comprised in SMTC)
- CSI-RS based measurements based on a certain numerology (e.g., same or different numerology of SSB of the same cell).

In step 604, the radio network node transmits (i.e. forwards) the indication of the capability received in step 602 to a network node, such as a positioning network node or a location server (e.g., the LMF described above).

In step 606, the radio network node transmits, to the positioning network node or location server, an indication of a CSI-RS configuration used by the radio network node for positioning purposes. The indication may be transmitted in an LPPa or an NPPa message, for example. In alternative embodiments, the configuration may be independently transferred via operations and/or management interfaces.

The CSI-RS configuration for each radio network node may comprise one or more of the following parameters:

- index or identity used to generate CSI-RS sequence and distinguish between different beams
- Numerology (e.g., subcarrier spacing, cyclic prefix (CP), etc.)
- Bandwidth (e.g., in the number of physical radio resource blocks (PRBs)—note that the size of PRB depends on the numerology)
  - Note that the bandwidth may also be adapted for the UE, depending on its radio conditions and/or CSI-RS density, e.g., based on other measurements received from the UE, UE approximate location, UE best beam, other CSI-RS configuration parameters, etc.—a larger bandwidth may be configured for UE in worse radio conditions and/or with less dense CSI-RS subframes or slots carrying CSI-RS
  - Note that the number of consecutive subframes or slots with CSI-RS may also be adapted for the UE, depending on its radio conditions, e.g., based on other measurements received from the UE, UE approximate location, UE best beam, other CSI-RS configuration parameters, etc.—more subframes may be configured for UE in worse radio conditions and/or with a smaller bandwidth Transmit power indication
  - Note that the transmit power may be adapted for the UE, depending on its radio conditions and/or other CSI-RS parameters such as density or bandwidth, e.g., based on other measurements received from the UE, UE approximate location, UE best beam, other CSI-RS configuration parameters, etc.—a higher power may be configured for UE in worse radio conditions or small bandwidth or less dense CSI-RS or fewer CSI-RS subframes
- Density (e.g., a number of CSI-RS resources used per radio resource, such as a number of resource elements carrying CSI-RS per slot or subframe)
  - Note that density may also be adapted for the UE, depending on its radio conditions and/or bandwidth or number of CSI-RS subframes, e.g., based on other measurements received from the UE, UE approximate location, UE best beam, other CSI-RS configuration parameters, etc.—higher density may be configured for UE in worse radio conditions and/or with a smaller bandwidth
- Quasi co-located (QCL) or transmission configuration indication (TCI)-state property indication (e.g., for the serving cell)
- Implicit or explicit radio network node's transmit beam or transmit direction with CSI-RS, to allow the UE to adaptively configure its receiver and in some examples to avoid or minimize the need for UE receive beam sweeping
  - Note also that fewer directions (than actually transmitted by the BS) may be relevant for the UE and thus included in the assistance data for the UE, e.g., based on UE serving cell ID, best beam, UE approximate location, etc.—this selection may be done by the Location Server providing the positioning assistance data to the UE and/or by the radio network node providing the UE-specific CSI-RS configuration to the Location Server
- Carrier frequency (e.g., a frequency within a frequency band, frequency band, frequency range, etc.)
- Frequency hopping configuration (e.g., hopping pattern, offset, periodicity, repetition, etc.)

Muting configuration (e.g., muting pattern based on bit string)

An indication whether the CSI-RS configuration of the current cell and/or beam is the same or different from a reference CSI-RS configuration (e.g., in the serving cell or reference cell and/or beam)—this is useful to reduce the signaling overhead and avoid duplicate signaling for different cells For example, the number of consecutive subframes can be N1 for BW1 with density1 (e.g., N1=2, BW1=96 PRBs, density1=density level 3) and N2 for BW2 with density2 (e.g., N1=6, BW1=48 PRBs, density1=density level 3) for Es/Iot>=−3 dB. In another example, N3 for BW3 with density3 (e.g., N3=6, BW3=96 PRBs, density3=density level 3) and N4 for BW4 with density4 (e.g., N4=12, BW4=48 PRBs, density4=density level 3) for Es/Iot>=−6 dB. That is, a first set of parameters is used for a first coverage level and a second set of parameters is used for a second coverage level.

In NR positioning, the CSI-RS configuration may be for a serving cell, a reference cell, or one or more neighbor cells. The CSI-RS configuration communicated from a base station to the location server may be non-UE specific for one or more cells associated with the radio network node or it may be UE specific (for one or more serving cells and one or more best beams of the UE).

An example CSI-RS configuration for NR positioning is as follows:

```
-- ASN1START
CSI-RS-Info-r16 ::= SEQUENCE { csi-rs-MeasurementBW SEQUENCE {
    nrofPRBs            ENUMERATED { size24, size48, size96, size192, size264},
    startPRB            INTEGER(0..2169),
    },
    csi-RS-Index        CSI-RS-Index,
    slotConfig          CHOICE {
        ms4                 INTEGER (0..31),
        ms5                 INTEGER (0..39),
        ms10                INTEGER (0..79),
        ms20                INTEGER (0..159),
        ms40                INTEGER (0..319)
    }
    resourceMapping     CSI-RS-ResourceMapping,
    csi-rs-OccGroupLen  ENUMERATED {g2, g4, g8, g16, g32, g64, g128,...
}
    csi-rs-MutingInfo   CHOICE {
        po2-r9              BIT STRING (SIZE(2)),
        po4-r9              BIT STRING (SIZE(4)),
        po8-r9              BIT STRING (SIZE(8)),
        po16-r9             BIT STRING (SIZE(16)),
        ...,
    }
}
CSI-RS-Index ::= INTEGER (0..maxNrofCSI-RS-ResourcesPositioning-1)
```

CSI-RS-Info field descriptions nrofPRBs
Allowed size of the measurement BW in PRBs Corresponds to L1 parameter 'CSI-RS-measurementBW-size' (see FFS_Spec, section FFS_Section).

startPRB
Starting PRB index of the measurement bandwidth Corresponds to L1 parameter 'CSI-RS-measurement-BW-start' (see FFS_Spec, section FFS_Section) FFS_Value: Upper edge of value range unclear in RAN1.

csi-RS-Index
CSI-RS resource index associated to the CSI-RS resource to be measured (and used for reporting).

resourceMapping
OFDM symbol and subcarrier occupancy of the ZP-CSI-RS resource within a slot slotConfig
Indicates the CSI-RS periodicity (in milliseconds) and for each periodicity the offset (in number of slots). When subcarrierSpacingCSI-RS is set to 15 kHZ, the maximum offset values for periodicities ms4/ms5/ms10/ms20/ms40 are 3/4/9/19/39 slots. When subcarrierSpacingCSI-RS is set to 30 kHZ, the maximum offset values for periodicities ms4/ms5/ms10/ms20/ms40 are 7/9/19/39/79 slots. When subcarrierSpacingCSI-RS is set to 60 kHZ, the maximum offset values for periodicities ms4/ms5/ms10/ms20/ms40 are 15/19/39/79/159 slots. When subcarrierSpacingCSI-RS is set 120 kHZ, the maximum offset values for periodicities ms4/ms5/ms10/ms20/ms40 are 31/39/79/159/319 slots.

csi-rs-muting
This field specifies the csi-rs muting configuration of the cell or beam. If a bit in the CSI-RS muting sequence is set to "0", then no CSI-RS is transmitted in all the CSI-RS occasions in the corresponding CSI-RS occasion group. A CSI-RS occasion group comprises one or more CSI-RS occasions as indicated by CSI-RSOccGroupLen.

csi-RS-OccGroupLen
This field specifies the CSI-RS occasion group length, defined as the number of consecutive CSI-RS occasions comprising a CSI-RS occasion group. Each CSI-RS occasion of the PRS occasion group consists of periodicity defined by slotConfig. Enumerated values define 2, 4, 8 and 16 consecutive CSI-RS occasions. If omitted, the CSI-RS occasion group length is 1.

The information element CSI-RS-ResourceMapping may be used to configure the resource element mapping of a CSI-RS resource in time- and frequency domain. See, for example 3GPP TS 38.331, v 15.3.0.

the network node or location server to configure a wireless device to perform positioning measurements on CSI-RS transmissions by the base station, based on the respective CSI-RS configurations.

```
-- ASN1START
-- TAG-CSI-RS-RESOURCEMAPPING-START
CSI-RS-ResourceMapping ::=         SEQUENCE {
    frequencyDomainAllocation          CHOICE {
        row1                               BIT STRING (SIZE (4)),
        row2                               BIT STRING (SIZE (12)),
        row4                               BIT STRING (SIZE (3)),
        other                              BIT STRING (SIZE (6))
    },
    nrofPorts                          ENUMERATED {p1,p2,p4,p8,p12,p16,p24,p32},
    firstOFDMSymbolInTimeDomain        INTEGER (0..13),
    firstOFDMSymbolInTimeDomain2           INTEGER (2..12)
OPTIONAL, -- Need R
    cdm-Type                           ENUMERATED {noCDM, fd-CDM2, cdm4-FD2-TD2, cdm8-FD2-TD4},
    density                            CHOICE {
        dot5                               ENUMERATED {evenPRBs, oddPRBs},
        one                                NULL,
        three                              NULL,
        spare                              NULL
    },
    freqBand                           CSI-FrequencyOccupation,
    ...
}
-- TAG-CSI-RS-RESOURCEMAPPING-STOP
-- ASN1STOP
```

In step 608, the radio network node transmits CSI-RS signals (e.g., to the wireless device) in accordance with its CSI-RS configuration.

Figure 7:
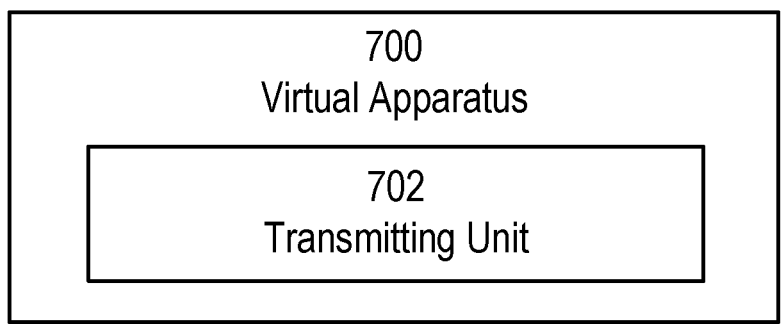
FIG. 7 shows a virtualization apparatus according to embodiments of the disclosure.

FIG. 7 illustrates a schematic block diagram of an apparatus 700 in a wireless network (for example, the wireless network shown in FIG. 10). The apparatus may be implemented in a network node (e.g., network node 1060 shown in FIG. 10). Apparatus 700 is operable to carry out the example method described with reference to FIG. 6 and possibly any other processes or methods disclosed herein. It is also to be understood that the method of FIG. 6 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 702, and any other suitable units of apparatus 700 to perform corresponding functions according one or more embodiments of the present disclosure.

As illustrated in FIG. 7, apparatus 700 includes transmitting unit 702. In one embodiment, transmitting unit 702 is configured to transmit, to a positioning network node or location server, a configuration message comprising an indication of a channel-state-information reference signal (CSI-RS) configuration utilized by the base station, enabling In another embodiment, transmitting unit 702 is configured to transmit, to a wireless device, a configuration message comprising an indication of respective channel-state-information reference signal (CSI-RS) configurations utilized by one or more radio network nodes of the wireless network, enabling the wireless device to perform positioning measurements on CSI-RS transmissions by the one or more radio network nodes, based on the respective CSI-RS configurations.

Figure 8:
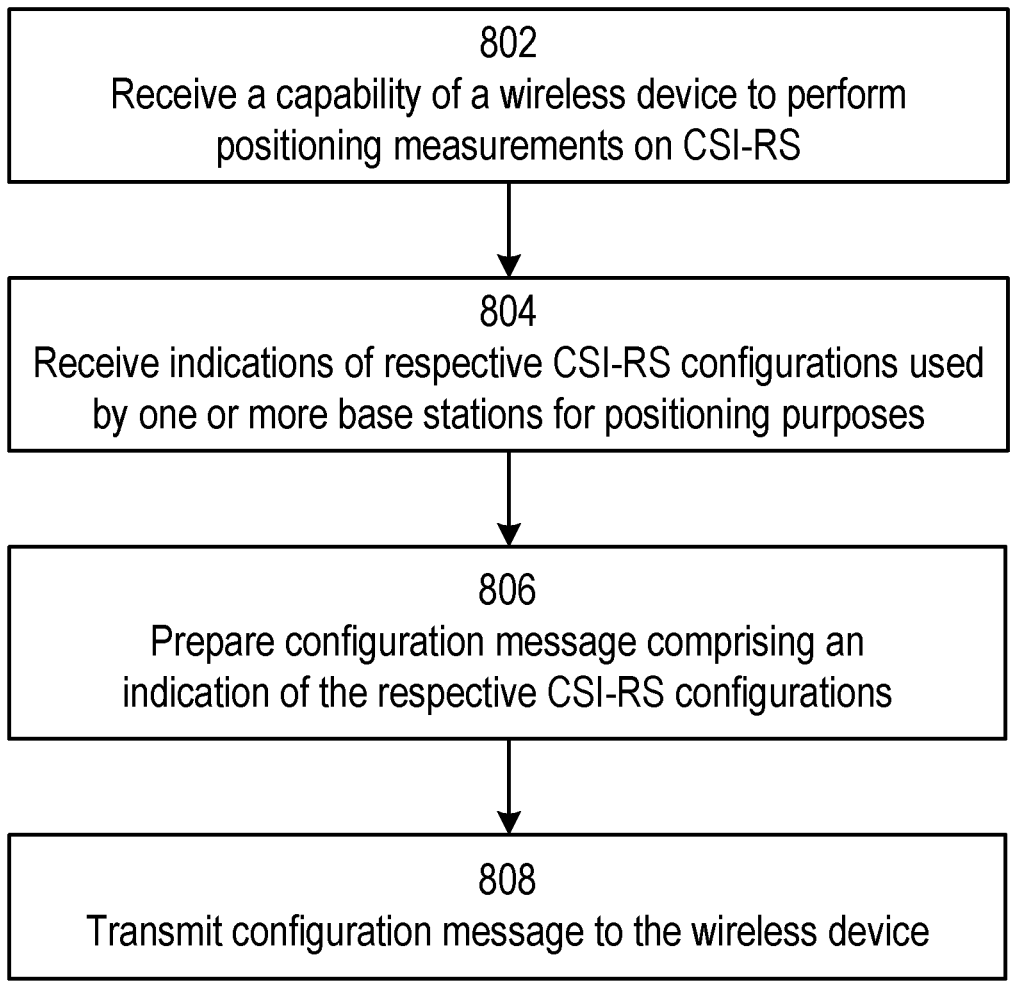
FIG. 8 is a flowchart of a method according to embodiments of the disclosure.

FIG. 8 depicts a method in accordance with particular embodiments, which may be performed by or implemented in a network node (such as a location server or positioning network node described above, e.g., LMF).

The network node is in the description seen from the perspective of the wireless device as the entity responsible for configuring the wireless device with positioning assistance data as well as receiving from the wireless device measurement reports. In some embodiments, the network node is an entity in the core network, while in other embodiments, the network node is an entity in the radio access network. In the latter embodiment, the network node may be implemented together with base station functions. The network node entity for configuring the wireless device may be different from the network node entity obtaining the measurements from the wireless device.

The method begins at step 802, in which the network node receives an indication of a capability of a wireless device to perform positioning measurements on CSI-RS transmissions. The indication may be received directly from the wireless device (e.g., as described above with respect to step 402), or indirectly via a radio network node (e.g., as described above with respect to steps 602 and 604).

The capability may comprise one or more of the UE ability to support for positioning purpose (e.g., OTDOA or E-CID):
    CSI-RS based signal strength or quality measurements (e.g., RSRP/RSRQ/SINR-like measurements)

CSI-RS based timing measurements (e.g., TDOA, TOA, RTT, Rx-Tx, etc.)

CSI-RS angular measurements (e.g., angle of arrival)

CSI-RS based intra-frequency measurements

CSI-RS based measurements for PCell

CSI-RS based measurements for PSCell

CSI-RS based measurements for one or more SCells

CSI-RS based measurements for intra-frequency neighbor cells

CSI-RS based inter-frequency measurements

CSI-RS based measurements in a specific part of the frequency spectrum (e.g., FR1 and/or FR2)

CSI-RS based measurements with a specific configuration (e.g., bandwidth not smaller than a threshold, density not smaller than a threshold, periodicity not smaller than a threshold)

CSI-RS based intra-frequency measurement with measurement gaps

CSI-RS based intra-frequency measurements outside active DL bandwidth part (BWP)

measurements on CSI-RS with specific QCL properties and/or TCI-state (e.g., having a specific QCL type with some channel; quasi co-located with a specific CORESET; not quasi co-located with any CORESET or a specific CORESET, etc.)

CSI-RS based measurements based on minimum UE requirements for such measurements (e.g., minimum bandwidth and/or minimum density, minimum number of consecutive slots or subframes, periodicity below a threshold, lowest Es/Iot which may impact the transmit power or imply a certain interference coordination or muting patterns, QCL and/or TCI-state property, minimum synchronization requirement or maximum time misalignment with a reference timing, etc.)

CSI-RS based measurements with a certain relation to SMTC configuration of the same cell (e.g., CSI-RS within or outside the subframes comprised in SMTC)

CSI-RS based measurements based on a certain numerology (e.g., same or different numerology of SSB of the same cell).

In step 804, the network node receives indications of respective CSI-RS configurations used by one or more radio network nodes (e.g., base stations) for positioning purposes. The CSI-RS configurations may be received via LPPa or NPPa messages, for example.

The CSI-RS configuration for each radio network node may comprise one or more of the following parameters:

index or identity used to generate CSI-RS sequence and distinguish between different beams Numerology (e.g., subcarrier spacing, cyclic prefix (CP), etc.)

Bandwidth (e.g., in the number of physical radio resource blocks (PRBs)—note that the size of PRB depends on the numerology)

Note that the bandwidth may also be adapted for the UE, depending on its radio conditions and/or CSI-RS density, e.g., based on other measurements received from the UE, UE approximate location, UE best beam, other CSI-RS configuration parameters, etc.—a larger bandwidth may be configured for UE in worse radio conditions and/or with less dense CSI-RS subframes or slots carrying CSI-RS Note that the number of consecutive subframes or slots with CSI-RS may also be adapted for the UE, depending on its radio conditions, e.g., based on other measurements received from the UE, UE approximate location, UE best beam, other CSI-RS configuration parameters, etc.—more subframes may be configured for UE in worse radio conditions and/or with a smaller bandwidth Transmit power indication Note that the transmit power may be adapted for the UE, depending on its radio conditions and/or other CSI-RS parameters such as density or bandwidth, e.g., based on other measurements received from the UE, UE approximate location, UE best beam, other CSI-RS configuration parameters, etc.—a higher power may be configured for UE in worse radio conditions or small bandwidth or less dense CSI-RS or fewer CSI-RS subframes Density (e.g., a number of CSI-RS resources used per radio resource, such as a number of resource elements carrying CSI-RS per slot or subframe)

Note that density may also be adapted for the UE, depending on its radio conditions and/or bandwidth or number of CSI-RS subframes, e.g., based on other measurements received from the UE, UE approximate location, UE best beam, other CSI-RS configuration parameters, etc.—higher density may be configured for UE in worse radio conditions and/or with a smaller bandwidth Quasi co-located (QCL) or transmission configuration indication (TCI)-state property indication (e.g., for the serving cell)

Implicit or explicit radio network node's transmit beam or transmit direction with CSI-RS, to allow the UE to adaptively configure its receiver and in some examples to avoid or minimize the need for UE receive beam sweeping Note also that fewer directions (than actually transmitted by the BS) may be relevant for the UE and thus included in the assistance data for the UE, e.g., based on UE serving cell ID, best beam, UE approximate location, etc.—this selection may be done by the Location Server providing the positioning assistance data to the UE and/or by the radio network node providing the UE-specific CSI-RS configuration to the Location Server Carrier frequency (e.g., a frequency within a frequency band, frequency band, frequency range, etc.)

Frequency hopping configuration (e.g., hopping pattern, offset, periodicity, repetition, etc.)

Muting configuration (e.g., muting pattern based on bit string)

An indication whether the CSI-RS configuration of the current cell and/or beam is the same or different from a reference CSI-RS configuration (e.g., in the serving cell or reference cell and/or beam)—this is useful to reduce the signaling overhead and avoid duplicate signaling for different cells For example, the number of consecutive subframes can be N1 for BW1 with density1 (e.g., N1=2, BW1=96 PRBs, density1=density level 3) and N2 for BW2 with density2 (e.g., N1=6, BW1=48 PRBs, density1=density level 3) for Es/Iot>=−3 dB. In another example, N3 for BW3 with density3 (e.g., N3=6, BW3=96 PRBs, density3=density level 3) and N4 for BW4 with density4 (e.g., N4=12, BW4=48 PRBs, density4=density level 3) for Es/Iot>=−6 dB.

That is, a first set of parameters is used for a first coverage level and a second set of parameters is used for a second coverage level.

In NR positioning, the CSI-RS configuration may be for a serving cell, a reference cell, or one or more neighbor cells. The CSI-RS configuration communicated from a base station to the location server may be non-UE specific for one or more cells associated with the radio network node or it may be UE specific (for one or more serving cells and one or more best beams of the UE).

An example CSI-RS configuration for NR positioning is as follows:

```
-- ASN1START
CSI-RS-Info-r16 ::= SEQUENCE { csi-rs-MeasurementBW SEQUENCE {
    nrofPRBs            ENUMERATED { size24, size48, size96, size192, size264},
    startPRB            INTEGER(0..2169),
    },
    csi-RS-Index        CSI-RS-Index,
    slotConfig          CHOICE {
        ms4                 INTEGER (0..31),
        ms5                 INTEGER (0..39),
        ms10                INTEGER (0..79),
        ms20                INTEGER (0..159),
        ms40                INTEGER (0..319)
    }
    resourceMapping     CSI-RS-ResourceMapping,
    csi-rs-OccGroupLen  ENUMERATED {g2, g4, g8, g16, g32, g64, g128,...
}
    csi-rs-MutingInfo   CHOICE {
        po2-r9              BIT STRING (SIZE(2)),
        po4-r9              BIT STRING (SIZE(4)),
        po8-r9              BIT STRING (SIZE(8)),
        po16-r9             BIT STRING (SIZE(16)),
        ...,
    }
}
CSI-RS-Index ::= INTEGER (0..maxNrofCSI-RS-ResourcesPositioning-1)
```

| CSI-RS-Info field descriptions |
|---|
| nrofPRBs |
| Allowed size of the measurement BW in PRBs Corresponds to L1 parameter 'CSI-RS-measurementBW-size' (see FFS_Spec, section FFS_Section). |
| startPRB |
| Starting PRB index of the measurement bandwidth Corresponds to L1 parameter 'CSI-RS-measurement-BW-start' (see FFS_Spec, section FFS_Section) FFS_Value: Upper edge of value range unclear in RAN1. |
| csi-RS-Index |
| CSI-RS resource index associated to the CSI-RS resource to be measured (and used for reporting). |
| resourceMapping |
| OFDM symbol and subcarrier occupancy of the ZP-CSI-RS resource within a slot |
| slotConfig |
| Indicates the CSI-RS periodicity (in milliseconds) and for each periodicity the offset (in number of slots). When subcarrierSpacingCSI-RS is set to 15 kHZ, the maximum offset values for periodicities ms4/ms5/ms10/ms20/ms40 are 3/4/9/19/39 slots. When subcarrierSpacingCSI-RS is set to 30 kHZ, the maximum offset values for periodicities ms4/ms5/ms10/ms20/ms40 are 7/9/19/39/79 slots. When subcarrierSpacingCSI-RS is set to 60 kHZ, the maximum offset values for periodicities ms4/ms5/ms10/ms20/ms40 are 15/19/39/79/159 slots. When subcarrierSpacingCSI-RS is set 120 kHZ, the maximum offset values for periodicities ms4/ms5/ms10/ms20/ms40 are 31/39/79/159/319 slots. |
| csi-rs-muting |
| This field specifies the csi-rs muting configuration of the cell or beam. If a bit in the CSI-RS muting sequence is set to "0", then no CSI-RS is transmitted in all the CSI-RS occasions in the corresponding CSI-RS occasion group. A CSI-RS occasion group comprises one or more CSI-RS occasions as indicated by CSI-RSOccGroupLen. |
| csi-RS-OccGroupLen |
| This field specifies the CSI-RS occasion group length, defined as the number of consecutive CSI-RS occasions comprising a CSI-RS occasion group. Each CSI-RS occasion of the PRS occasion group consists of periodicity defined by slotConfig. Enumerated values define 2, 4, 8 and 16 consecutive CSI-RS occasions. If omitted, the CSI-RS occasion group length is 1. |

The information element CSI-RS-ResourceMapping may be used to configure the resource element mapping of a CSI-RS resource in time- and frequency domain. See, for example 3GPP TS 38.331, v 15.3.0.

```
-- ASN1START
-- TAG-CSI-RS-RESOURCEMAPPING-START
CSI-RS-ResourceMapping ::=          SEQUENCE {
    frequencyDomainAllocation           CHOICE {
        row1                                BIT STRING (SIZE (4)),
        row2                                BIT STRING (SIZE (12)),
        row4                                BIT STRING (SIZE (3)),
        other                               BIT STRING (SIZE (6))
    },
    nrofPorts                           ENUMERATED {p1,p2,p4,p8,p12,p16,p24,p32},
    firstOFDMSymbolInTimeDomain         INTEGER (0..13),
    firstOFDMSymbolInTimeDomain2            INTEGER (2..12)
```

```
    OPTIONAL, -- Need R
        cdm-Type                    ENUMERATED {noCDM, fd-CDM2, cdm4-FD2-TD2, cdm8-
FD2-TD4},
        density                     CHOICE {
            dot5                        ENUMERATED {evenPRBs, oddPRBs},
            one                         NULL,
            three                       NULL,
            spare                       NULL
        },
        freqBand                    CSI-FrequencyOccupation,
        ...
}
-- TAG-CSI-RS-RESOURCEMAPPING-STOP
-- ASN1STOP
```

In step 806, the network node prepares a configuration message comprising an indication of the respective CSI-RS configurations used by one or more radio network nodes. For example, an indication may be provided for all of the CSI-RS configurations received in step 804, or a subset thereof. In one embodiment, the configuration message is prepared based on the capability of the wireless device received in step 802 (e.g., tailored or adapted to suit the capability of the wireless device). For example, the CSI-RS configurations indicated in the configuration message may comprise only CSI-RS parameters which are relevant for measurements which the wireless device is capable of performing, or CSI-RS configurations used by radio network nodes which the wireless device is capable of measuring.

The configuration message may comprise an LTE Positioning Protocol (LPP) message or a NR Positioning Protocol (NPP) message, for example. Alternatively the configuration message may be transmitted via a different message, such as via RRC signalling. The configuration message may be received directly from a network node such as a positioning network node or a location server (e.g., the LMF described above), or indirectly from a network node via a radio network node (e.g., a serving base station).

The one or more radio network nodes for which CSI-RS configurations are provided may comprise one or more of: a serving radio network node, a reference network node (which may be the serving radio network node), and one or more neighbouring network nodes. For example, the CSI-RS configurations may be provided within assistance data provided by the network node for the purposes of positioning. The CSI-RS configurations may be utilized for the cells served by those radio network nodes, or for one or more beams transmitted by those radio network nodes (e.g., where different transmission beams utilize different CSI-RS configurations).

In one embodiment the reference cell information and neighbor cell information are updated such that CSI-RS configurations are provided. One example is shown below where the reference cell information is updated to include the CSI-RS configuration. Corresponding adjustments can be made for the neighbour cells as well.

```
-- ASN1START
OTDOA-ReferenceCellInfo ::= SEQUENCE {
    physCellId                  INTEGER (0..503),
    cellGlobalId                ECGI                    OPTIONAL,       -- Need ON
    earfcnRef                   ARFCN-ValueEUTRA        OPTIONAL,       -- Cond
NotSameAsServ0
    antennaPortConfig           ENUMERATED {ports1-or-2, ports4, ... }
                                                        OPTIONAL,       -- Cond
NotSameAsServ1
    cpLength                    ENUMERATED { normal, extended, ... },
    prsInfo                     PRS-Info                OPTIONAL,       -- Cond
PRS
    ...,
    [[ earfcnRef-v9a0           ARFCN-ValueEUTRA-v9a0   OPTIONAL        -- Cond
NotSameAsServ2
    ]],
    [[ tpId-r14                 INTEGER (0..4095)       OPTIONAL,       -- Need ON
        cpLengthCRS-r14         ENUMERATED { normal, extended, ... }
                                                        OPTIONAL,       -- Cond
CRS
        sameMBSFNconfigRef-r14  BOOLEAN                 OPTIONAL,       -- Need ON
        dlBandwidth-r14         ENUMERATED {n6, n15, n25, n50, n75, n100}
                                                        OPTIONAL,       -- Cond
NotSameAsServ3
        addPRSconfigRef-r14     SEQUENCE (SIZE (1..maxAddPRSconfig-r14)) OF PRS-Info
                                                        OPTIONAL        -- Need ON
    ]],
    [[
        nr-LTE-SFN-Offset-r15   INTEGER (0..1023)       OPTIONAL        -- Cond NR
    ]],
    [[
```

-continued

```
        csi-rs-Info-r16        CSI-RS-Info-r16        OPTIONAL,        -
- Cond NR
        ]]
    }
}
maxAddPRSconfig-r14    INTEGER ::= 2
-- ASN1STOP
```

Alternatively, a separate definition for the NR reference and neighbor cells is considered. The following example utilizes a LPP format.

```
-- ASN1START
OTDOA-NR-ReferenceCellInfo ::= SEQUENCE {
    physCellId          INTEGER (0..1007)    OPTIONAL,
    cellGlobalId        NR-ECGI              OPTIONAL, -- Need ON
    csi-rs-Info-r16     CSI-RS-Info-r16      OPTIONAL,
    earfcnRef           ARFCN-ValueNR        OPTIONAL,
                                             -- Cond NotSameAsServ0
    antennaPortConfig   ENUMERATED {ports1-or-2, ports4, ... }
                                             OPTIONAL,
                                             -- Cond NotSameAsServ1
    cpLength            ENUMERATED { normal, extended, ... },
    prsInfo             PRS-Info             OPTIONAL, -- Cond PRS
}
-- ASN1STOP
```

Note that the NR physical cell ID (physCellId) is optional, which enables the configuration of positioning assistance data independent of the PCI. Therefore, an identEfier associated with the reference cell may not be cell specific. Therefore, the terms 'reference cell' and 'neighbor cell' can be replaced by identifiers which are cell agnostic, such as node or anchor. In one embodiment, the reference is one transmission reception point (TRP), while the neighbors are other TRPs all associated to the same cell.

In step 808, the network node initiates transmission of the configuration message to the wireless device (see also step 404 described above). For example, the network node may transmit the configuration message to the wireless device directly. Alternatively, the network node may initiate transmission of the configuration message to the wireless device by a radio network node (such as apparatus 700 or the network node 1060 described below). In the latter embodiment, the network node may transmit the configuration message to the radio network node for onward transmission to the wireless device.

Figure 9:
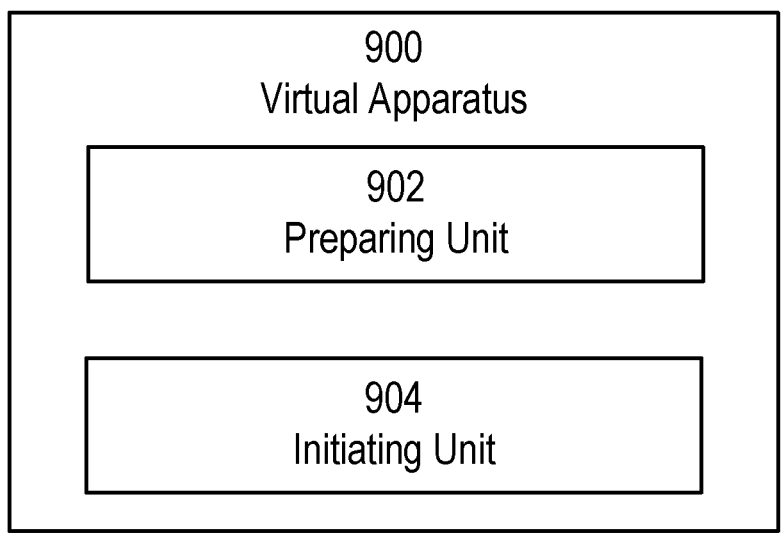
FIG. 9 shows a virtualization apparatus according to embodiments of the disclosure.

FIG. 9 illustrates a schematic block diagram of an apparatus 900 in a wireless network (for example, the wireless network shown in FIG. 10). The apparatus may be implemented in a network node, such as a positioning network node or a location server (e.g., network node 1060 shown in FIG. 10 or LMF shown in FIG. 1). Apparatus 900 is operable to carry out the example method described with reference to FIG. 8 and possibly any other processes or methods disclosed herein. It is also to be understood that the method of FIG. 8 is not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause preparing unit 902 and initiating unit 904, and any other suitable units of apparatus 900 to perform corresponding functions according one or more embodiments of the present disclosure.

As illustrated in FIG. 9, apparatus 900 includes preparing unit 902 and initiating unit 904. Preparing unit 902 is configured to prepare a configuration message comprising an indication of respective channel-state-information reference signal (CSI-RS) configurations utilized by one or more radio network nodes of the wireless network. Initiating unit 904 is configured to initiate transmission of the configuration message to a wireless device, enabling the wireless device to perform positioning measurements on CSI-RS transmissions by the one or more radio network nodes, based on the respective CSI-RS configurations. For example, apparatus 900 may transmit the configuration message to the wireless device directly. Alternatively, apparatus 900 may initiate transmission of the configuration message to the wireless device by a radio network node (such as the network node 1060 or apparatus 700 described below). In the latter embodiment, apparatus 900 may transmit the configuration message to the radio network node for onward transmission to the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
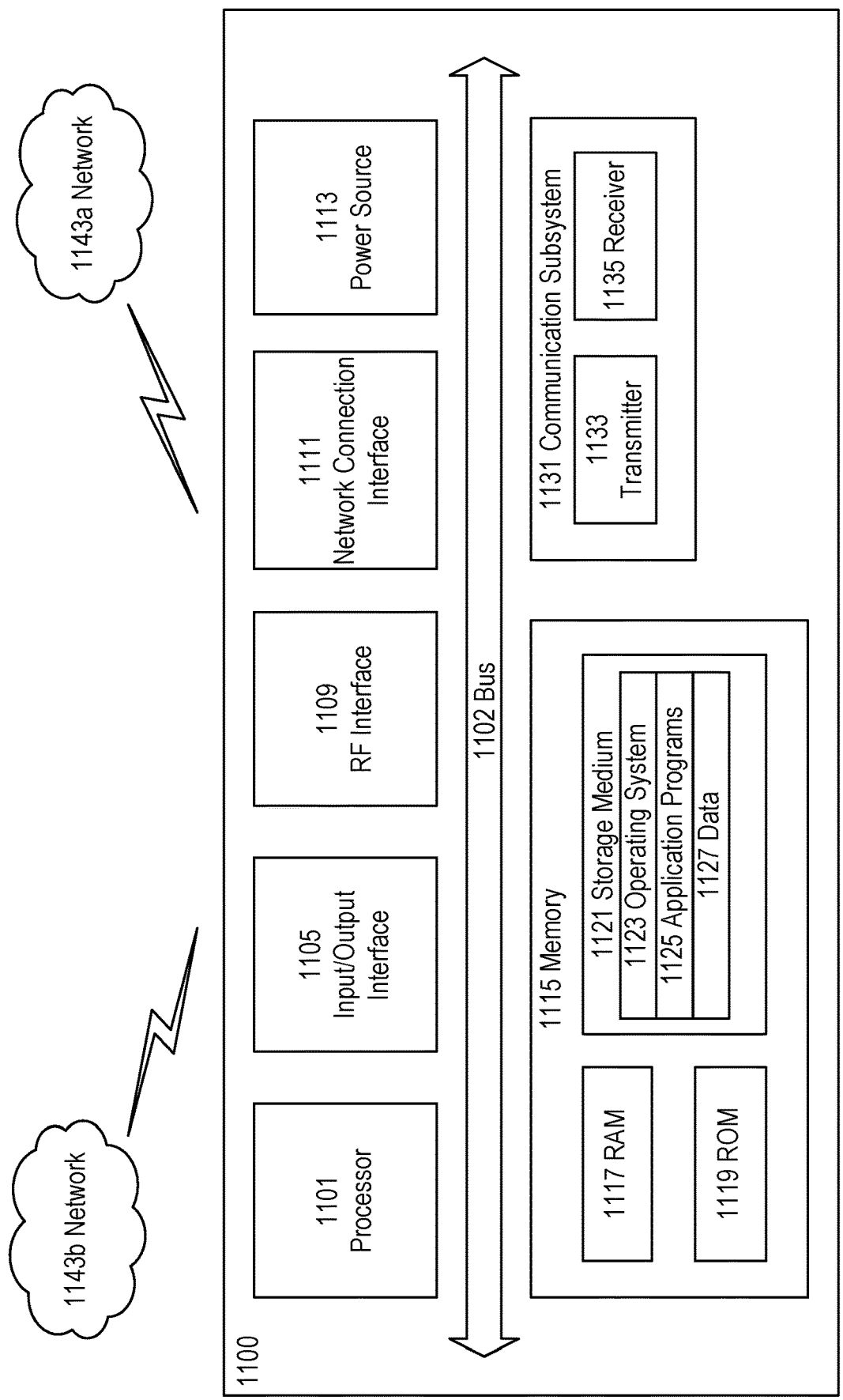
FIG. 11 shows a user equipment according to embodiments of the disclosure.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DI MM), synchronous dynamic random access memory (SDRAM), external micro-DIM M SDRAM, smartcard memory such as a subscriber identity module or a removable user identity (SI M/RUI M) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
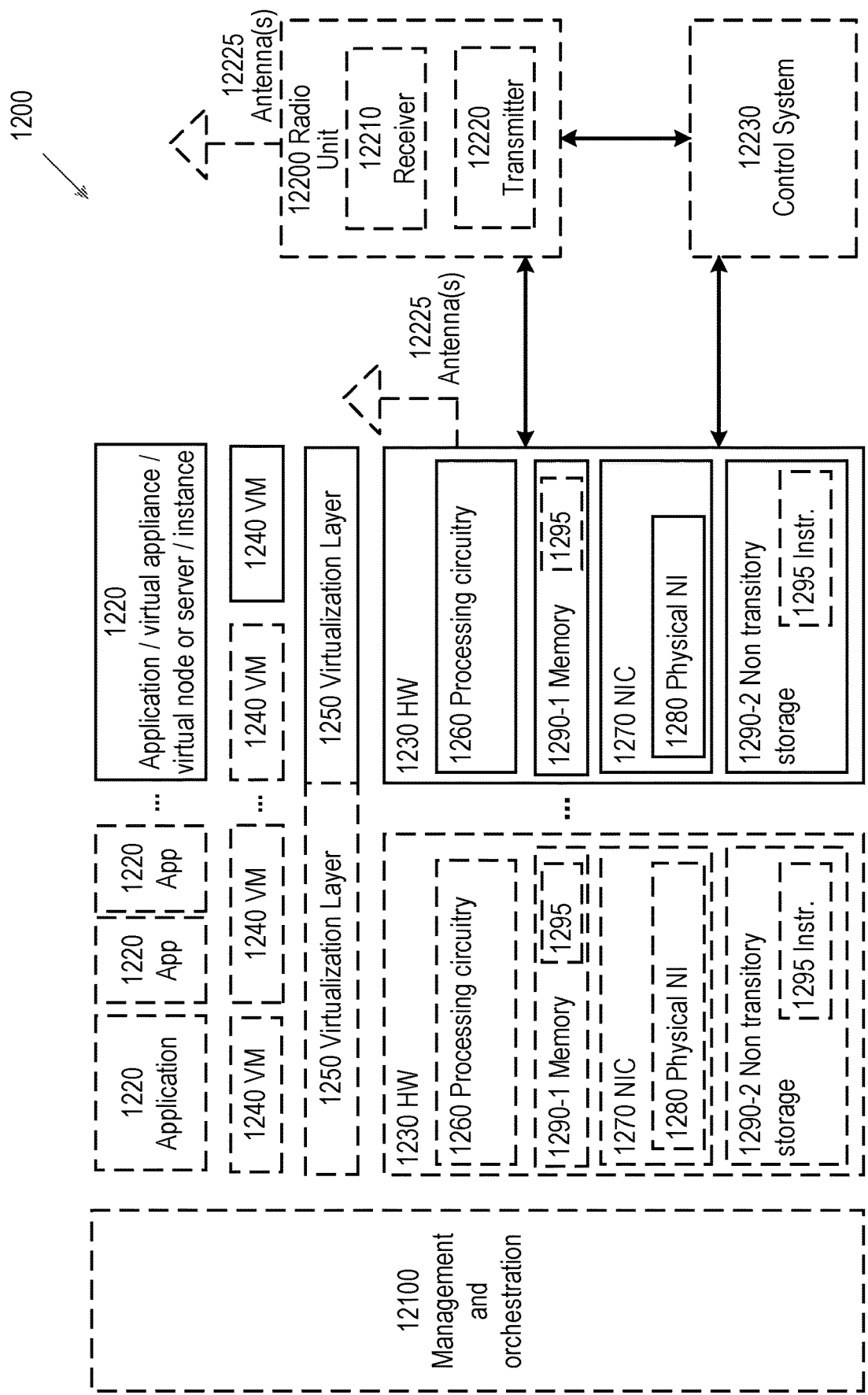
FIG. 12 shows a virtualization environment according to embodiments of the disclosure.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
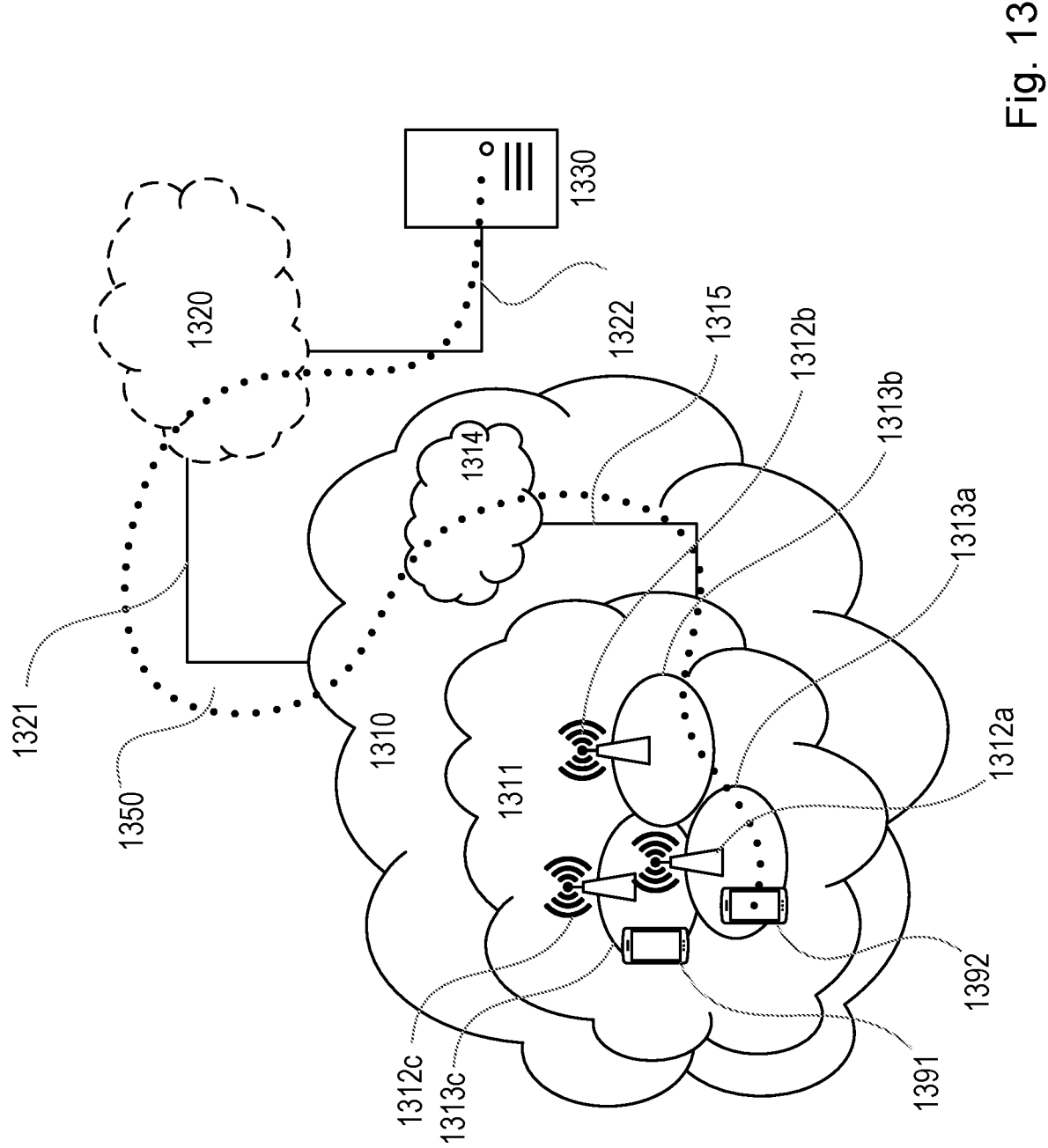
FIG. 13 shows a telecommunication network connected via an intermediate network to a host computer according to embodiments of the disclosure.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
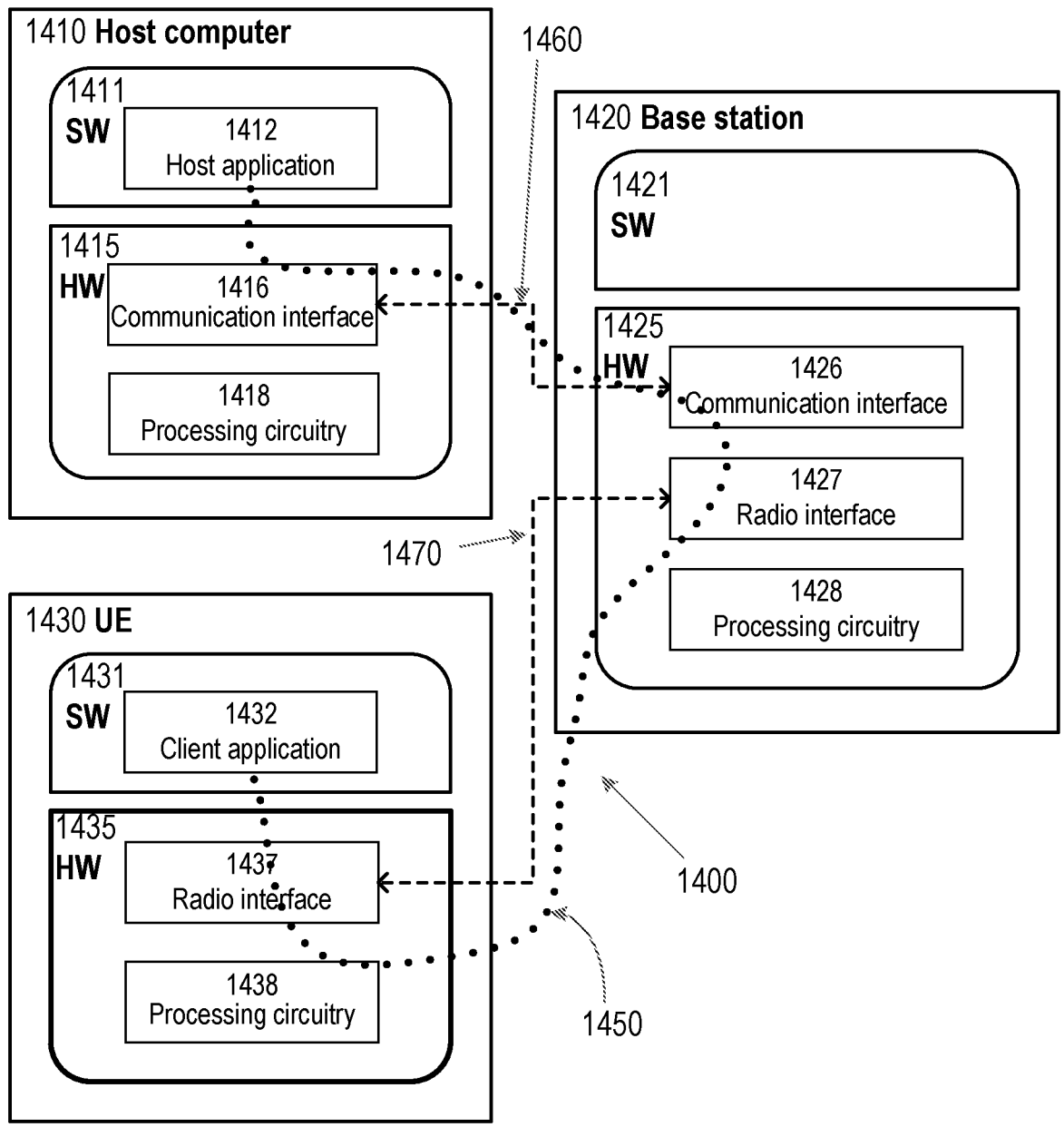
FIG. 14 shows a host computing communicating via a base station with a user equipment over a partially wireless connection according to embodiments of the disclosure.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410'*s* measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
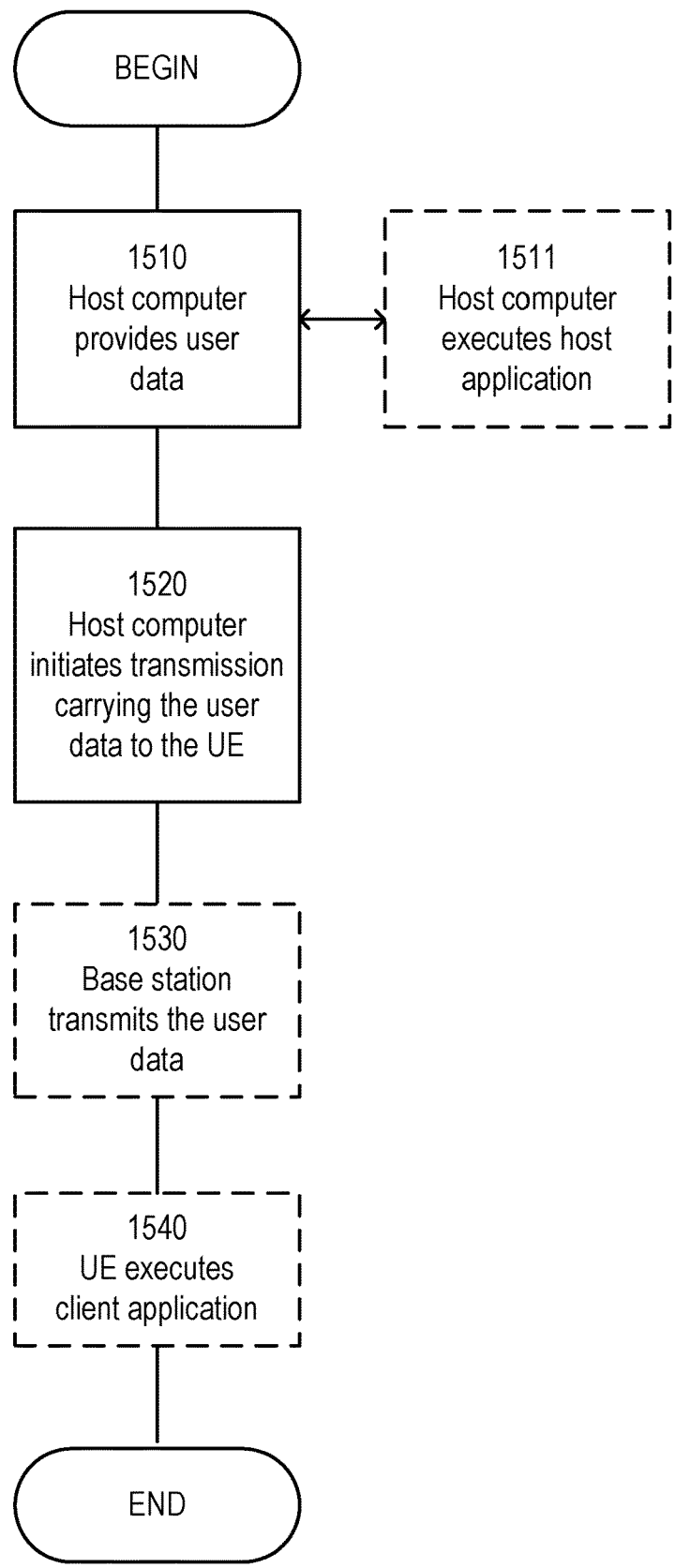
FIGS. 15-18 are flowcharts of methods implemented in a communication system including a host computer, a base station, and a user equipment according to embodiments of the disclosure.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
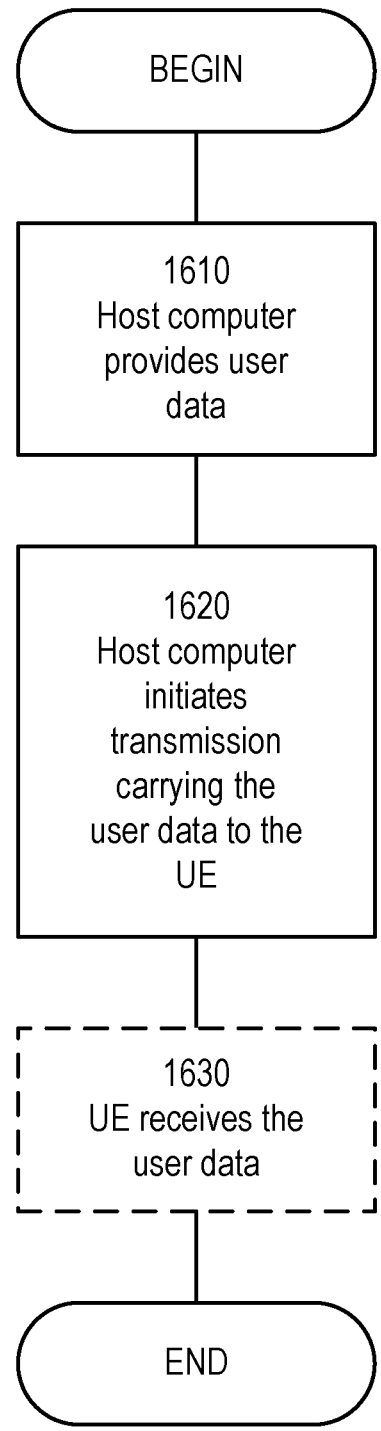

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
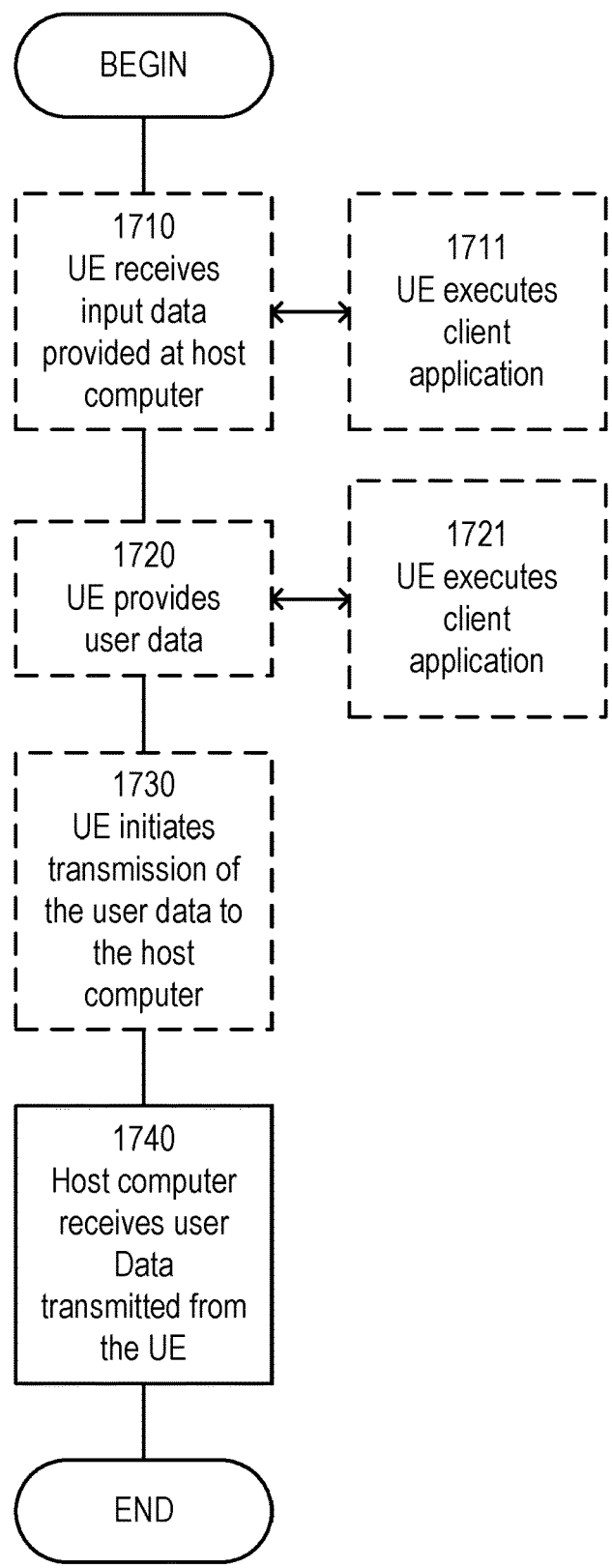

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
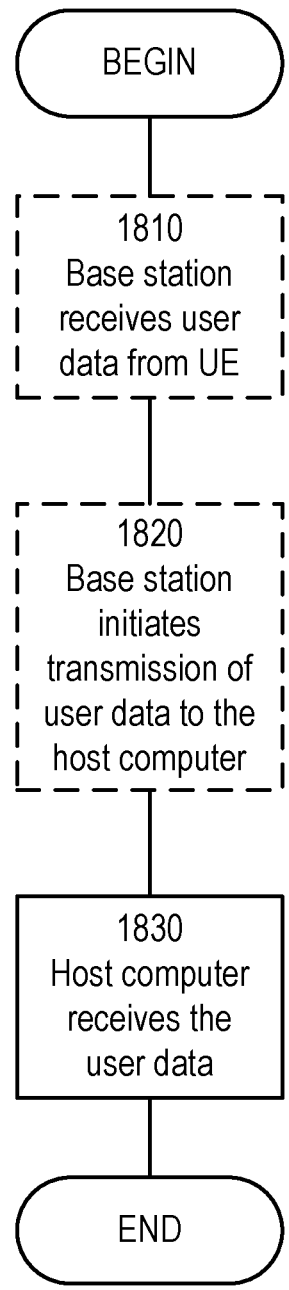

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

APPENDIX

The Rel 16 study item on NR positioning aims at different types of use cases, including both regulatory and commercial use cases. The study item description (RP-182155, Study on NR positioning support, RAN1, Intel Corporation, Ericsson, June 2019) defines the objectives, including the following for the potential solutions:

Study and evaluate potential solutions of positioning technologies based on the above identified requirements, evaluation scenarios/methodologies [RAN1]

The solutions should include at least NR-based RAT dependent positioning to operate in both FR1 and FR2 whereas other positioning technologies are not precluded.

Minimum bandwidth target (e.g. 5 MHz) of NR with scalability is supported towards general extension for any applications.

Solution concepts, proposed baseline configurations and restrictions are discussed.

The LTE E-CID scope can be supported in NR based on available RRM measurements defined in Rel. 15 and propose to support reporting of E-CID measurements based on available RRM measurements and to add a text proposal to the TR.

Positioning methods in 3GPP are typically defined by one or several device capabilities, signal and procedure definitions and configurations, measurements and associated requirements, as well as positioning algorithms. Albeit the latter is up to implementations, there are some common understanding of what corresponds to typical algorithms. The RAT dependent positioning in LTE is typically divided into three positioning methods (3GPP TS 36.305, Stage 2 functional specification of User Equipment (UE) positioning in E-UTRAN):

Downlink positioning
Uplink positioning
Enhanced Cell ID

LTE downlink positioning is based on device measurements of reference signal time difference (RSTD) with respect to pairs of cells. The time difference estimate is based on time of arrival measurements per cell, either based on PSS/SSS/CRS or a configured positioning reference signal (PRS). The PRS can be configured with a bandwidth, repetition and periodicity, and it is also possible to configure more than one PRS per cell, for example in the case when there are multiple transmission points associated to the same cell. The RSTD measurements are exploited in a time difference of arrival (TDOA) method, labelled Observed TDOA (OTDOA).

LTE uplink positioning utilizes a configured uplink signal for reception at multiple location measurement units (LMU). The considered uplink signal is the channel sounding reference signals (SRS), configured via RRC by the serving eNB, and the SRS configuration is shared to the LMUs and LMU reports the measured Uplink Relative Time of Arrival (UL-RTOA) to the location server. The key unknown parameter is the device transmission time of the SRS, which can be removed by forming relative differences of UL-RTOA, leading to an uplink TDOA (UTDOA) method. LTE E-CID is a common name for position related information that can enhance the cell ID only positioning. In LTE, it is limited to measurements and information that is anyway available due to other functions or procedures. It includes radio signal strength and quality measurements associated to the serving cell as well as neighbour cells at the same carrier or different carrier for the same RAT, or different RATs. Moreover, it also includes serving cell timing advance information and serving cell angle of arrival estimates.

Essentially, a similar set of positioning methods can be considered for NR but adapted to the new enablers and concepts in NR. We discuss these positioning methods, and also split E-CID into one part based on measurements and information available from Rel. 15, and one part based on measurements and procedures introduced in Rel. 16, possibly tailored to NR positioning needs.

OTDOA is based on device measurements of relative time differences of references signals from different base stations.

Suitable downlink reference signals may be any of the already existing downlink NR signals or new NR signals introduced dedicatedly for downlink positioning, or combinations of these. Suitable downlink reference signals and associated measurement aspects are discussed below.

The configuration and reporting framework are not necessarily the same as in LTE, due to for example much stricter latency requirements in some use cases. The architecture is discussed below.

UTDOA is based on reception and time of arrival estimation of a UE uplink signal at multiple LMUs. Suitable uplink reference signals may be any of the existing uplink NR signals or new NR uplink signals, or combinations of these. This and measurement aspects are discussed below.

The configuration and reporting framework can be different from LTE, for example due to much stricter latency requirements in some use cases. The architecture is discussed below.

LTE E-CID is based on readily available measurements and procedure information in the UE and the eNB. The same approach will be adopted in NR. A starting scope for NR E-CID should be measurements and procedure information that has been introduced in NR Rel. 15, both in the UE and the gNB. These includes radio resource measurements of radio signal strength and quality, but also relative timing measurements. The corresponding signals and associated measurements are discussed below. These are also put into the NR E-CID context. There are also configuration and reporting aspects that are addressed below.

NR introduces new concepts, features, functions, procedures, information, etc. Therefore, the enhanced Cell ID scope can be further enhanced by introducing measurements and information based on these NR specific components. It is instructive to discuss these separately, as is briefly initiated below.

From the initial requirements discussions in the SID, it is clear that NR positioning signals and procedures should be flexible and configurable to meet different required levels of accuracy, latency etc. In NR Rel. 15 there are reference signals in downlink and uplink which can be useful for positioning measurements. Moreover, when deciding upon positioning reference signals, we think that the existing reference signals should serve as a baseline. In the sections below, we discuss existing reference signals that already are, or we believe could be considered useful for positioning and hence we propose suitable baseline configurations.

In general, one may consider the following three different approaches to the selection or design of adequate and flexible downlink positioning reference signals:
  Existing reference signals as is (also used as baseline).
  Existing reference signals with extensions (building on existing signals or completely new design).
  A new design of a Positioning Reference Signal independent of any existing NR reference signals.

We will focus on the first approach in order to set a baseline before venturing into extensions and new designs.

In LTE, downlink positioning is based on device measurements of RSTD with respect to pairs of cells. The time difference estimate is based on time of arrival measurements per cell, either based on the LTE always on signals LTE PSS/SSS/CRS or on a LTE PRS configured specifically for positioning purposes.

For NR it's natural to consider similar alternatives, i.e. the NR PSS/SSS in the NR SS-block, but also the NR CSI-RS for tracking also referred to as the NR TRS which can be configured to meet the combined requirements on synchronization and time of arrival estimation. The SS-block can be assumed by the UE always to be transmitted with a 20 ms periodicity for initial access. Since the SS-block anyhow may be transmitted, the use of the SS-block also for positioning doesn't impose any additional overhead.

The TRS configuration is UE-specific, configured by the RRC protocol and the TRS may therefore be turned off when there are no connected UE in the cell. It is also possible to configure all UEs in a cell with the same shared TRS (or with multiple shared TRSs). It's also clearly possible, by implementation, to keep transmitting the shared TRS as long as considered relevant, for example as long as there are connected UE's in neighbor cells requiring the TRS for measurements even if there is no connected UE in own cell. However, a higher layer entity would be needed to control the coordinated use of CSI resources between all cells involved in positioning in a region, for example similar to how positioning resources are coordinated in LTE. Finally, it should be noted that re-utilizing the CSI-RS for tracking for positioning purposes imposes only a very limited additional overhead and only in cells with no load.

Observation 1 The SS-block may have to be transmitted for initial access and synchronization purposes and can be reused also as a positioning signal without overhead.
  Observation 2 The TRS (CSI-RS for tracking) has to be transmitted for fine time and frequency tracking purposes when there is at least one connected UE in a cell and the TRS can therefore be reused as a positioning reference signal with no or very limited additional overhead.

One might also consider other existing DL reference signals in NR Rel. 15 such as NR PDSCH DMRS or NR PTRS. DMRS and PTRS are, however, always transmitted together with its associated PDSCH data. This fact makes it less suitable to be used as a DL PRS, since it's not always present and when present it's beamformed/precoded to optimize reception by the UE receiving the PDSCH data which may be far from optimal for other UEs. Also transmissions from adjacent cells may strongly interfere on coinciding DMRS REs. We will therefore focus below on the SS-block and the TRS.

Observation 3 PDCH DMRS and PTRS in the DL is less suitable as a downlink positioning reference signal since they are transmitted together with PDSCH data and due to expected interference from transmitted data from adjacent BSs.

The SS-block has a bandwidth of 20 RB and consists of four consecutive symbols. The first SS-block symbol carries the PSS utilizing 127 centrally located subcarriers within the SS-block. The remaining subcarriers in the first SS-block symbol are left unused for PSS protection. The third SS-block symbol carries the SSS utilizing 127 centrally located subcarriers within the SS-block. The remaining four RB's on each side of the SSS within the SS-block are used for PBCH. The second and fourth SS-block symbols are fully utilized for PBCH. Within PBCH RBs every fourth subcarrier (with offset given by the cell ID modulo 4) is utilized for PBCH DMRS. The PSS, SSS and PBCH DMRS signals are known to the UE and can in principle be used for positioning measurements such as TOA.

The position of the SS-block in the frequency domain is configurable and could in principle be used to create orthogonality between SS-blocks in neighboring cells, with a reuse factor given by the full bandwidth divided by the SS-block bandwidth of 20 RB. In practice the SS-block position in frequency is, however, typically configured to be the same in all cells to enable efficient neighbor cell search.

SS-blocks are transmitted in bursts with configurable periodicity from 5 ms to 160 ms. An SS block for initial access shall, however, be transmitted at least every 20 ms. Each SS burst consists of a number of SS-blocks (typically transmitted over different beams) all transmitted within one half frame (5*ms*). The maximum number L of SS-blocks in an SS-block burst is 4 below 3 GHz, 8 from 3 GHz to 6 GHz and 64 above 6 GHz. The L candidate positions for the SS-blocks within a half frame are fixed given the subcarrier spacing of the SS-block and the frequency band.

Observation 3 The resource allocation scheme of the SS block for tracking allows orthogonal transmission from neighboring base stations utilizing both frequency and time multiplexing but this has an impact on the efficiency of neighbor cell search.

Figure 3:
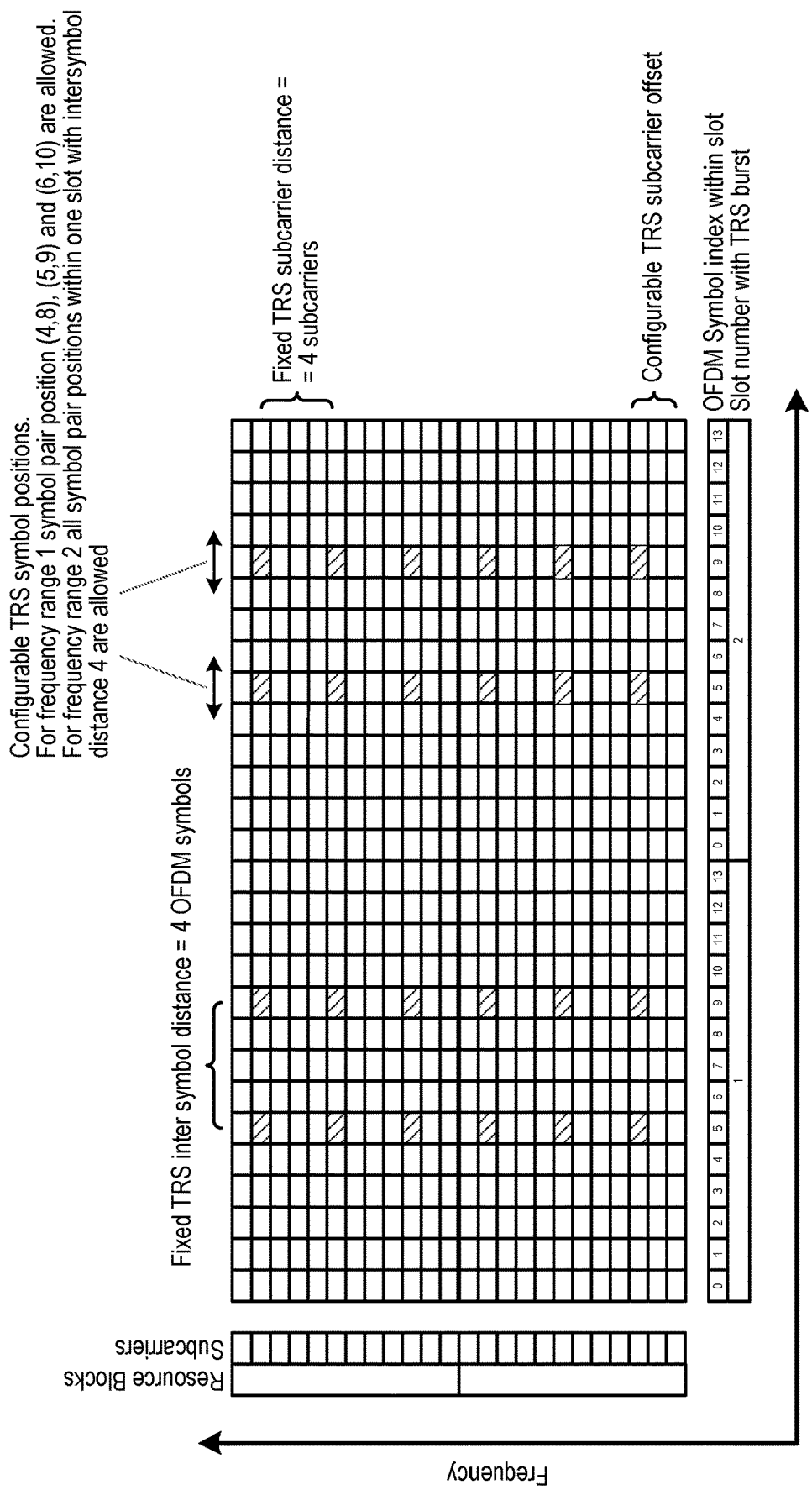
FIG. 3 shows an illustration of a TRS design in the time/frequency domain.

The configuration of the CSI-RS for tracking, also referred to as the TRS (Tracking Reference signal) is described in section 5.1.6.1.1 on CSI-RS for tracking in TS 38.214 (Section 5.1.6.1.1 on CSI-RS for tracking in TS 38.214, NR; Physical layer procedures for data) and in section 7.4.1.5 on CSI reference signals in TS 38.211 (Section 7.4.1.5 on CSI reference signals in TS 38.211, NR; Physical channels and modulation). The TRS is configured as a NZP-CSI-RS-ResourceSet configured with higher layer parameter trs-Info. The NZP CSI-RS resource set consists of two or four CSI-RS resources each consisting of one single symbol. As described above, the time frequency pattern of the TRS is visualized in FIG. 3. The TRS is transmitted in periodic bursts that are one or two slots long. The periodicity is 10 ms, 20 ms, 40 ms or 80 ms and the position of the bursts in time is configurable with a slot offset with 1 slot granularity. The TRS has a comb-4 pattern in frequency, which can be frequency shifted across base stations. This allows received base station's signals to be orthogonal. For additional interference immunity it is possible to shift the symbol pattern of the TRS in time within a slot or by utilizing different slot offsets for the TRS bursts. The TRS is scrambled with a 31-bit Gold sequence.

Observation 4 The resource allocation scheme of the TRS allows orthogonal transmission from neighboring base stations utilizing both frequency and time multiplexing. Simultaneously, the use of Gold codes provides additional interference immunity.

For a given UE the TRS shall be configured to be larger than or equal to 50 RB (up to the full system bandwidth) or equal to the UE BWP. In practice the bandwidth of the CSI-RS for tracking transmitted in a cell and shared among UE's with different BWPs is therefore between 50 RB and the full system bandwidth.

Observation 5 The bandwidth of the TRS is configurable up to the full system bandwidth.

As mentioned earlier, the TRS is UE-specifically configured. It can, however, be configured in an identical way for all connected UE's in a cell. This means that all connected UE's in a cell may share the same transmitted TRS, allowing a highly efficient use of reference signal in terms of overhead. Such a TRS would always be transmitted as long as there is at least one connected UE in the cell. Clearly, it is natural to try to utilize such an almost always on signal, designed for fine time tracking, also for positioning purposes.

In Rel. 15 the TRS is only used for fine frequency and time tracking and the UE is only utilizing the TRS transmitted from its serving cell. For positioning the UE needs to utilize also the TRS transmitted from other cells. In order accomplish that the location server would configure UE's with a number of positioning reference signals with identical properties (utilized time-frequency resources, scrambling sequence etc.) as the TRS's transmitted from the transmission points to be used by the UE for positioning. The TRS in a cell would then need to be transmitted as long as there is at least one connected UE in the cell or at least one UE configured to utilize the TRS for positioning. The TRS is typically transmitted for fine tracking purposes with a periodicity of 20 ms or 40 ms. If positioning would work sufficiently well with a longer periodicity than what is used for fine tracking purposes the location server could configure UEs with a positioning signal with identical properties as the TRS except that it would have a period that would be a multiple of the TRS period. Then, only a fraction of the TRS bursts can be used for positioning, but energy can be saved by reducing the number of TRS bursts transmitted as soon as there is no connected UE in a cell.

In comparison with the SS-block we note that the TRS has better orthogonality properties and a larger bandwidth. We also note that the TRS utilizes more subcarriers per symbol than PSS/PBCH DMRS/SSS+PBCH DMRS/PBCH DMRS in the four symbols of the SS-block. Clearly the CSI-RS for tracking is superior for positioning purposes.

A key factor for the coverage of a positioning reference signal is the average number of symbols used per time unit for the signal, since that together with the output power of the gNB and the symbol length gives the average power utilized for the positioning reference signal. For the TRS the number of symbols per time is given by $2 \cdot N_{TRS}/T_{TRS}$ where TTRS is the TRS burst periodicity and NTRS is the burst length which can be one or two slots. For comparison, the number of symbols per time for the LTE PRS is $8 \cdot N_{PRS}/T_{PRS}$ where TPRS is the PRS periodicity and NPRS is the PRS duration which can be 1, 2, 4 or 6 LTE subframes. We note that a 2 slot TRS with 20 ms periodicity utilize four times as many symbols per time unit as a PRS with 160 ms periodicity and 1 subframe duration.

Clearly the TRS is suitable for positioning purposes and we propose to use the TRS as a baseline for the evaluations of downlink reference signals for positioning with the configurations given in Table 1 for FR1 and in Table 2 for FR2. At high frequencies the TRS will typically be beamformed and we consequently propose a configuration with multiple beams for FR2. One may note that the use of beams gives additional information on Angle of Departure (AoD) that can be of used for positioning.

Observation 6 The transmission of the TRS in multiple beams gives additional information on Angle of Departure (AoD) that can be utilized for positioning purposes.

Since the TRS is a comb-4 signal, the power can be concentrated to the TRS resource elements, enabling a 6 dB power boosting.

Observation 7 The comb-4 structure of TRS enables a 6 dB power boosting if the power is concentrated to the TRS resource elements.

To facilitate the analysis of new proposals for downlink positioning reference signals, it is important to define a baseline that all proposals needs to relate to and compare to in simulations. Therefore, we have defined TRS configurations in Table 1 and 2. In relation, we have the following proposal:

Proposal 1 Use the TRS (CSI-RS for tracking) configurations for FR1 in Table 1 and FR2 in Table 2 as baseline, which means that all proposed NR positioning downlink reference signals shall be evaluated with the corresponding baseline of the same bandwidth and periodicity.

The proposed baseline downlink positioning reference signal in Proposal 1 has been evaluated in system simulations in Scenario 3 with FR1 showing that it is capable of meeting the regulatory requirements in that scenario. Moreover, link level results also show a promising technology potential for accurate positioning sub-meter. For further details, see R1-1813590, Evaluation methodologies and scenarios for NR Positioning.

Transmitting TRS in multiple cells, potentially different from the UE serving cell, will require that the network coordinates between cells to create an orthogonal set of TRS configurations across the set of cells involved in the positioning measurement. This is a protocol issue that is natural to continue discussing in RAN2 and RAN3.

Proposal 2 Ask RAN2 to study signaling and configuration aspects of CSI-RS with tracking for downlink positioning, including resource coordination and muting.

TABLE 1

Description of baseline configurations for the TRS (CSI-RS for tracking) in FR1

| | |
|---|---|
| TRS bandwidths | System Bandwidth |
| Comb factor | 4 |
| Subcarrier offset | 0, 1, 2 or 3. |
| Symbol positions in a burst of the CSI-RS for tracking | (4, 8), (5, 9) or (6, 10) |
| Slot offset | Alt. 1. Same in all cells |
| | Alt. 2, Different in all cells (corresponding to ideal muting in LTE PRS simulations) |
| Number of CSI-RS for tracking configured in each cell (i.e. number of beams). | 1 |
| Periodicity | Flexible in the set {20, 40, 80, 160} ms |
| Burst length | Two slots |
| Sequence | Gold sequence according to NR specification for CSI-RS |
| Power boosting of TRS Res | 6 dB |

TABLE 2

Description of baseline configurations for the CSI-RS for tracking in FR2

| | |
|---|---|
| Bandwidth | System Bandwidth. |
| Comb factor | 4 |
| Subcarrier offset | 0, 1, 2 or 3. |
| Symbol positions in a CSI-RS burst | four different symbol positions. |
| Slot offset | Alternative 1: three different slot offsets {Allowing 12 beams + reuse 4 in combination with subcarrier offset and symbol positions} |
| | Alternative 2: six different slot offsets {Allowing 12 beams + reuse 8 in combination with subcarrier offset and symbol positions} |
| | Alternative 3: twelve different slot offsets {Allowing 12 beams + reuse 12 in combination with subcarrier offset and symbol positions} |
| | Alternative 4: Different in all cells (corresponding to ideal muting in LTE PRS simulation) |

TABLE 2-continued

Description of baseline configurations for the CSI-RS for tracking in FR2

| | |
|---|---|
| Bandwidth | System Bandwidth. |
| Number of CSI-RS for tracking configured in one cell (i.e. number of beams). | 12 |
| Periodicity | Flexible in the set {20, 40, 80, 160} ms |
| Burst length | One slot |
| Sequence | Gold sequence according to NR specification for CSI-RS |
| Power boosting of TRS REs | 6 dB |

If the TRS doesn't give sufficiently good positioning accuracy one could augment the TRS with additional time frequency resources. The location server would then configure the UE with a number of positioning reference signals transmitted from different cells. This signal would be identical to the TRS transmitted in the same cell in all overlapping time-frequency resources but could utilize additional time-frequency resources as compared to the TRS. One simple example would be to add resources corresponding to an additional TRS shifted in time relative the original TRS, in order to add additional energy to the signal.

A very important aspect in the design of downlink positioning signals is the interference mitigation techniques used to increase hearability of multiple transmission points as needed for triangulation.

On a high level one may distinguish between well-known methods such as using orthogonal signals (typically on the time/frequency grid) and using signals which have been scrambled with different code sequences. In addition one may consider using identical signals, which add constructively in the receiver.

One well known technique is the transmission of orthogonal positioning signals that utilize non-overlapping resource elements in frequency and time from transmission points that are close to each other. As an example, a comb pattern in frequency can be shifted in frequency across Base Stations to generate a set of non-overlapping resource element patterns. The time dimension can be utilized to generate non-overlapping resource element patterns e.g. by using different symbols within a slot or simply by utilizing different slots for the transmission of the positioning signals. Moreover, muting patterns as in LTE can be considered to create schemes where only a subset of the cells transmit at each positioning occasion. Clearly, these mechanisms come at a cost of increased resource element utilization for positioning. For patterns utilizing the same symbols but different subcarriers the cost may, however, have limited impact since power-constraints may anyhow limit the usage of unused subcarriers.

An alternative to the transmission of orthogonal signals from different base stations could be to transmit identical signals from different base stations and resolve the signals from the different base station in the time domain.

Since the number of orthogonal signals will always be limited, the signals from all base stations in the network can't be made orthogonal. To mitigate interference between such non-orthogonal signals, modulating sequences and the corresponding initialization parameters should be designed to give very low correlation between potentially interfering signals. In NR signals transmitted in different cells, from different transmission points and over different beams could benefit from low correlation properties. Depending on the deployment, it should be possible to utilize e.g. cell ID and/or transmission point ID, and/or beam ID for the initialization of the modulating sequences. This is, however, most flexibly achieved by specifying an independent positioning reference signal ID, as for LTE.

Proposal 3 The sequence initialization should be based on an independent positioning reference signal id which in an implementation can be flexibly coupled to e.g. cell ID, transmission point ID, and/or beam ID depending on the scenario and deployment.

To avoid interference from data one typically want to avoid transmission of data in the same resource elements and from the same cell or from a cell close enough to create significant interference as a positioning reference signal. In NR there exist a number of mechanisms to achieve this in an efficient way. The simplest method is to just not schedule data in a slot utilized for one or more positioning reference signals. If the positioning reference signals are not utilizing all resource elements in the slot, this is however an inefficient use of resources. In NR one may in this case instead configure the UE with a RateMatchPattern in the RRC PDSCH configuration (PDSCH-Config) or in the RRC serving cell configuration (ServingCellConfigCommon) informing the UE that certain symbols (as given by the RateMatchPattern) are not used for data transmission. The UE will then receive data only on the remaining symbols and will thus rate match around the symbols utilized by the positioning reference signal. Alternatively, one may configure the UE with a zero power CSI-RS (ZP-CSI-RS) with a certain resource element pattern. The UE will then receive data only on the resource elements that are not part of the resource element pattern of the ZP-CSI-RS. Assuming the resource elements of the ZP-CSI-RS matches the resource elements of the positioning reference signal, the UE will rate match around the reference elements of the positioning reference signal. The UE does, of course also have the capability to rate match around non zero power CSI-RSs and for Rel. 16 one may consider rate matching around a positioning reference signal.

Observation 8 Configured rate matching methods for the data channel can assist with interference mitigation for the positioning signal in scenarios where positioning signals and data coexist.

Observation 9 Rate matching can be done on the RE level or the symbol level.

In many cases positioning would benefit from richer UE reporting, where the UE reports timing not only associated to one path but includes several per reported cell, to increase the probability that the line of sight path is included.

Observation 10 Rich reporting of time of arrival, including multiple paths, can help the location entity to resolve ambiguity in the time of arrival due to the channel contribution.

Another dimension to create interference mitigation opportunity is beam scheduling. The physical reference signal that would be used for NR in FR1 is most likely transmitted via beams. In such cases, it would be desirable if there is a separation i.e. non-overlapping in frequency and time domain to mitigate intra/inter-beam interference. gNBs with the co-ordination of location server can apply beam scheduling in a round-robin (cyclic fashion) such that only one or few beams are transmitted at a time in order to obtain separation in time domain. UE can be provided with each beam's transmission starting period, periodicity and duration etc. Further, neighboring gNBs may select non-overlapping bandwidth for beams that would be used for reference signal transmission.

Observation 11 Beam scheduling can be considered for interference mitigation and improved hearability between gNBs Uplink timing for communication is established using either the uplink physical random access channel preambles (PRACH) during the random-access procedure or via a specific order from the network, or the demodulation reference signals that are transmitted in the uplink together with uplink data.

Uplink Sounding Reference Signals (SRS) is currently the main reference signal transmitted by the UE. We propose to use it as a baseline signal for evaluating uplink-based positioning methods.

SRS is the UE specifically-configured uplink signal. In time domain configuration, SRS can be configured for 1, 2, 3 or 4 symbols within the last 6 symbols of a slot. Typically, the slots can be transmitted with multiple periodicity, 1, 2, 4, 5, 10, 20, 40, 80, 160, 320, 640, 1280 or 2560 slots. All slot offsets are supported for a given periodicity value. SRS can be configured aperiodically as well. It can also support semi-persistent transmission, i.e., periodic until further notice.

In frequency domain, SRS can support up to 272 PRBs, nearly maximum bandwidth supported in NR, which is a useful feature for uplink-based positioning. Hence, SRS is flexible and can be configured with different bandwidth, symbol density, periodicity, etc.

Observation 12 It is feasible to use SRS for positioning purposes. Slot offset and comb offset can be used for orthogonality between UEs.

Again, to facilitate the analysis of new proposals for uplink positioning reference signals, it is important to define a baseline that all proposals needs to relate to and compare to in simulations. Therefore, we have defined SRS configurations in Table 3. In relation, we have the following proposal:

Proposal 4 Use the SRS configurations for FR1 and FR2 in Table 3 as baseline, which means that all proposed NR positioning uplink reference signals shall be evaluated the corresponding baseline with the same bandwidth and periodicity.

TABLE 3

Description of baseline configurations for SRS in FR1 and FR2

| Bandwidth | Maximum Bandwidth, 272 PRBs |
|---|---|
| Comb factor | 4 |
| Frequency Hopping pattern | No hopping |
| Numerology | All |
| No. of symbols | 1, 2, 4 |
| Slot periodicity | all possible values |
| Slot offset | all possible values |
| SRS ports | 1 |

For the UL, e.g. using UTDOA, different UEs would typically use orthogonal REs (for both DMRS and data), so the DMRS would not be interfered in the same way as in the DL when received at a particular BS. A DMRS signal received at multiple (at least three) BSs could thus be used as a PRS for positioning. One drawback is however that the DMRS is always used with data, so DMRS is not "always available" even in connected mode (unlike SRS), so whether it could be used would depend on the existence of UL data from the relevant UE. For this reason, the SRS, described above, is likely to be more generally applicable as an UL PRS and is therefore suggested to be used in the baseline Observation 13 Both SRS and DMRS may be used in the UL for e.g. UTDOA. However, since DMRS is not always available (unlike SRS) in connected mode, SRS is more generally applicable as an UL PRS.

Clearly downlink measurements that have been used for positioning in LTE, such as RSTD, RSRP, RSRQ and UE RX-TX time difference should be considered also for NR. In particular we note that the full downlink scope of the LTE E-CID can be supported in NR based on available RRM measurements defined in Rel. 15 (3GPP TS 38.215 V.15.3.0, NR; Physical layer measurements). These includes:

SS-RSRP and SS-RSRQ of serving and intra-frequency neighbor cells
SS-RSRP and SS-RSRQ of inter-frequency cells
SS-RSRPB of intra-frequency cells (only FR2)
CSI-RSRP and CSI-RSRQ of intra- and inter-frequency cells
Radio signal strength and quality of inter_RAT cells
Serving cell UE RX-TX time difference
Observation 14 The LTE E-CID downlink measurement scope can be supported in NR based on available RRM measurements defined in Rel. 15.

Furthermore, the downlink measurements include time of arrival measurements based on downlink positioning reference signals from serving and non-serving transmission points. The time of arrival measurements in the context of OTDOA are typically used to compile relative time difference measurements from pairs of transmission points to form RSTD measurements.

Observation 15 Downlink measurements includes downlink positioning reference signal time of arrival measurements from which the device can compile RSTD measurements as in LTE The LTE E-CID scope can again be supported based on existing Rel 15 NR measurements. The standardized uplink measurements used for E-CID are based on uplink time of arrival based on either DM-RS (type 1) or PRACH (type 2). In addition, there is the uplink-based angle of arrival, which is implementation specific Timing advance type 1 and 2
Angle of arrival The timing advance information is available in the serving base station, and if supported, the angle of arrival estimates can be provided based on uplink measurements in the serving transmission point.

Observation 16 The LTE E-CID uplink measurement scope can be supported in NR based on available measurements defined in Rel. 15 or via implementation.

Given a well-defined uplink waveform, the serving and non-serving reception points can determine the uplink time of arrival. That requires that the reception points are provided with information about the waveform. These time of arrival measurements are in LTE UTDOA reported as time relative a reference time as a UL-RTOA measurement.

Observation 17 Uplink measurements includes uplink positioning reference signal time of arrival measurements from which reception points can compile RTOA measurements as in LTE.

Given the observations, it is clear that the LTE E-CID scope can be supported based on Rel 15 NR measurements and information. Therefore, we have the following proposals:

Proposal 5 Support NR E-CID based on available RRM measurements and procedure information.

Proposal 6 Add the text proposal for NR E-CID in Appendix A.1 to the TR.

One may also consider the introduction of new measurements. At high frequencies the beam/angular dimensions become more important. UE reporting of which downlink beam has been used for a certain measurement could give additional information on the DL AoD. Likewise, a UE measurement of the DL AoA could potentially give improved positioning. For the DL AoA one would, however, need to take into account the mobile character of the UE orientation.

Serving cell round trip time (RTT) is already included to some extent with the timing advance that is already supported. If RTT measurements also can be enabled for non-serving cells, then triangulation-based positioning can be possible. This was introduced recently in GSM recently and can be considered for NR as well.

Proposal 7 Study possible extensions to NR E-CID based on NR specific measurements, procedures and information.

As described above, FIG. 1 illustrates a UE Positioning Architecture applicable to NG-RAN [3gpp 38.305].

The expectation to meet requirements in terms of latency, coverage etc. should ensure that the architecture aspect is not violated, and the defined Positioning architecture is leveraged upon.

From RAN1 perspective, the main nodes and interface would be UE, gNB and NR-Uu respectively. The LTE-Uu interface and ng-eNB can be omitted.

In terms of latency, from RAN1 perspective, it is mainly the NR-Uu interface delay, and measurement durations plus possibly some procedure delays. The objective is not to focus on NRPPa or NLs. The delays occurred in these interfaces would be assumed to be some constant value, if need be. Further, RAN2/RAN3 may study the end to end delay, as well as configuration and signaling aspects of the different considered positioning methods.

In the Cell ID (CID) positioning method, the UE position is estimated with the knowledge of the geographical coordinates of its serving ng-eNB or gNB.

Enhanced Cell ID (E-CID) positioning refers to techniques which use UE and/or NG-RAN radio resource related measurements to improve the UE location estimate.

Although E-CID positioning may utilise some of the same measurements as the measurement control system in the RRC protocol, the UE generally is not expected to make additional measurements for the sole purpose of positioning; i.e., the positioning procedures do not supply a measurement configuration or measurement control message, and the UE reports the measurements that it has available rather than being required to take additional measurement actions.

In cases with a requirement for close time coupling between UE and NG-RAN measurements (e.g., TADV type 1 and UE Rx-Tx time difference), NG-RAN configures the appropriate RRC measurements and is responsible for maintaining the required coupling between the measurements.

NOTE: For E-CID positioning methods the UE reports only the measurements that it has available rather than being required to take additional measurement actions.

E-CID measurements for NR per intra/inter-frequency or inter-RAT cell may include [x,y]:

UE measurements ([x], [y]):
NR SS reference signal received power (SS-RSRP)
NR CSI reference signal received power (CSI-RSRP)
NR SS reference signal received quality (SS-RSRQ)
NR CSI reference signal received quality (CSI-RSRQ)

NR SS reference signal received power per branch (SS-RSRPB)
UE NR Rx-Tx time difference;
E-UTRA Reference signal received power (RSRP);
E-UTRA Reference Signal Received Quality (RSRQ);
UE E-UTRA Rx-Tx time difference;
GERAN RSSI;
UTRAN CPICH RSCP;
UTRAN CPICH Ec/lo;
WLAN RSSI.
E-UTRAN measurements ([x], [y]):
gNB Rx-Tx time difference;
Timing Advance (TADV):
   Type1: TADV=(gNB Rx-Tx time difference)+(UE NR Rx-Tx time difference);
   Type2: TADV=gNB Rx-Tx time difference;
ng-eNB Rx-Tx time difference;
Timing Advance (TADV):
   Type1: TADV=(ng-eNB Rx-Tx time difference)+(UE E-UTRA Rx-Tx time difference);
   Type2: TADV=ng-eNB Rx-Tx time difference;
Angle of Arrival (AoA).

Various techniques exist to use these measurements to estimate the location of the UE.

For the avoidance of doubt, the following numbered paragraphs set out embodiments of the disclosure.

Group A Embodiments

1. A method performed by a wireless device relating to positioning in a wireless network, the method comprising:
   receiving, from a network node, a configuration message comprising an indication of respective channel-state-information reference signal (CSI-RS) configurations utilized by one or more radio network nodes of the wireless network; and
   performing positioning measurements on CSI-RS transmissions by the one or more radio network nodes, based on the respective CSI-RS configurations.

2. The method of embodiment 1, further comprising transmitting a capability of the wireless device to perform positioning measurements on CSI-RS transmissions.

3. The method of embodiment 2, wherein the capability of the wireless device to perform positioning measurements on CSI-RS transmissions is transmitted directly or indirectly to a positioning network node of the wireless network node.

4. The method of embodiment 2 or 3, wherein the capability of the wireless device to perform positioning measurements on CSI-RS transmissions comprises an indication of the wireless device to perform positioning measurements on CSI-RS transmissions comprising one or more of: CSI-RS based signal strength or quality measurements; CSI-RS timing measurements; CSI-RS angular measurements; CSI-RS based intra-frequency measurements; CSI-RS measurements for a primary cell (PCell); CSI-RS measurements for a primary secondary cell (PSCell); CSI-RS measurements for a secondary cell (SCell); CSI-RS measurements for intra-frequency neighbouring cells; CSI-RS based inter-frequency measurements; CSI-RS based measurements in a particular part of the transmission frequency spectrum; CSI-RS based measurements with a specific CSI-RS configuration; CSI-RS based intra-frequency measurements with measurement gaps; CSI-RS based intra-frequency measurements outside an active DL bandwidth part of the wireless device; measurements on CSI-RS transmissions with one or more specific quasi co-located (QCL) properties or transmission configuration indication (TCI) states; CSI-RS based measurements based on minimum requirements of the wireless device for performing CSI-RS based measurements; CSI-RS based measurements with a certain relation to synchronization signal (SS)physical broadcast channel (PBCH) Block Measurement Time Configuration (SMTC); CSI-RS based measurements based on a particular numerology.

5. The method of any one of embodiments 2 to 4, wherein the indication of the CSI-RS configurations is generated based on the capability of the wireless device to perform positioning measurements on CSI-RS transmissions.

6. The method of any one of the preceding embodiments, wherein the CSI-RS configuration relates to one or more CSI-RS resources utilized by the one or more radio network nodes.

7. The method of embodiment 6, wherein the one or more CSI-RS resources comprise a CSI-RS resource set.

8. The method of embodiment 7, wherein the CSI-RS resource set comprises one or more of an information element TRS-info set and a CSI-RS for tracking (also referred to as a tracking reference signal).

9. The method of any one of the preceding embodiments, wherein a respective CSI-RS configuration relates to one or more of a cell served by the radio network node or a beam transmitted by the radio network node.

10. The method of any one of the preceding embodiments, wherein the one or more radio network nodes comprise one or more of a transmission reception point and a base station.

11. The method of any one of the preceding embodiments, wherein the positioning measurements comprise timing measurements.

12. The method of embodiment 11, wherein the timing measurements comprise one or more of time-of-arrival (TOA) and reference signal time difference (RSTD) measurements.

13. The method of any one of the preceding embodiments, wherein the CSI-RS configurations comprise one or more of: an index or identity used to generate a CSI-RS sequence used in the CSI-RS transmissions; a numerology of the CSI-RS transmissions; a bandwidth used in the CSI-RS transmissions; a direction of a beam used to transmit the CSI-RS transmissions; a transmission frequency of the CSI-RS transmissions; a quasi co-located (QCL) or transmission configuration indication (TCI) indication; a density of the CSI-RS transmissions (e.g., a number of CSI-RS resources used per radio resource); a frequency-hopping configuration used in the CSI-RS transmissions; a muting configuration used in the CSI-RS transmissions; and an indication as to whether the CSI-RS configuration is the same as that used by a reference radio network node.

14. The method of any one of the preceding embodiments, wherein the one or more radio network nodes comprise one or more of: a serving radio network node for the wireless device; a reference radio network node; and one or more neighbouring radio network nodes.

15. The method of any one of the preceding embodiments, further comprising the step of reporting the positioning measurements to a positioning network node of the wireless network, enabling the positioning network node to determine a location of the wireless device based on the positioning measurements.

16. The method of any one of embodiments 1 to 14, further comprising determining a location of the wireless device based on the positioning measurements.

17. The method of any one of the preceding embodiments, further comprising receiving user data and CSI-RS in a transmission from a radio network node; and rate matching the user data over one or more radio resources not used by the CSI-RS.

18. The method of embodiment 17, wherein the wireless device rate matches the user data over resource elements of a slot or subframe not including resource elements or a symbol used by the CSI-RS.

19. The method of any one of the preceding embodiments, wherein the indication of respective channel-state-information reference signal (CSI-RS) configurations utilized by one or more radio network nodes of the wireless network is contained within assistance data in respect of the one or more radio network nodes.

20. The method of any one of the preceding embodiments, wherein the CSI-RS transmissions are to be configured as, or are configured as, tracking reference signals.

21. The method of any of the previous embodiments, further comprising:
providing user data; and
forwarding the user data to a host computer via the transmission to the base station.

Group B Embodiments

22. A method performed by a base station relating to positioning of a wireless device in a wireless network, the method comprising:
transmitting, to a positioning network node or location server, a configuration message comprising an indication of a channel-state-information reference signal (CSI-RS) configuration utilized by the base station, enabling the network node or location server to configure a wireless device to perform positioning measurements on CSI-RS transmissions by the base station, based on the respective CSI-RS configurations.

23. The method of embodiment 22, further comprising receiving a capability of the wireless device to perform positioning measurements on CSI-RS transmissions.

24. The method of embodiment 23, wherein the capability of the wireless device to perform positioning measurements on CSI-RS transmissions comprises an indication of the wireless device to perform positioning measurements on CSI-RS transmissions comprising one or more of: CSI-RS based signal strength or quality measurements; CSI-RS timing measurements; CSI-RS angular measurements; CSI-RS based intra-frequency measurements; CSI-RS measurements for a primary cell (PCell); CSI-RS measurements for a primary secondary cell (PSCell); CSI-RS measurements for a secondary cell (SCell); CSI-RS measurements for intra-frequency neighbouring cells; CSI-RS based inter-frequency measurements; CSI-RS based measurements in a particular part of the transmission frequency spectrum; CSI-RS based measurements with a specific CSI-RS configuration; CSI-RS based intra-frequency measurements with measurement gaps; CSI-RS based intra-frequency measurements outside an active DL bandwidth part of the wireless device; measurements on CSI-RS transmissions with one or more specific quasi co-located (QCL) properties or transmission configuration indication (TCI) states; CSI-RS based measurements based on minimum requirements of the wireless device for performing CSI-RS based measurements; CSI-RS based measurements with a certain relation to synchronization signal (SS)physical broadcast channel (PBCH) Block Measurement Time Configuration (SMTC); CSI-RS based measurements based on a particular numerology.

25. The method of any one of embodiments 23 to 24, wherein the indication of the CSI-RS configurations is generated based on the capability of the wireless device to perform positioning measurements on CSI-RS transmissions.

26. The method of any one of embodiments 23 to 25, further comprising transmitting the capability of the wireless device to perform positioning measurements on CSI-RS transmissions to the positioning network node or location server.

27. The method of any one of embodiments 22 to 26, wherein the CSI-RS configuration relates to one or more CSI-RS resources utilized by the one or more radio network nodes.

28. The method of embodiment 27, wherein the one or more CSI-RS resources comprise a CSI-RS resource set.

29. The method of embodiment 28, wherein the CSI-RS resource set comprises one or more of an information element TRS-info set and a CSI-RS for tracking (also referred to as a tracking reference signal).

30. The method of any one of embodiments 22 to 29, wherein a respective CSI-RS configuration relates to one or more of a cell served by the radio network node or a beam transmitted by the radio network node.

31. The method of any one of embodiments 22 to 30, wherein the one or more radio network nodes comprise one or more of a transmission reception point and a base station.

32. The method of any one of embodiments 22 to 31, further comprising receiving an indication of the positioning measurements from the wireless device; and providing the positioning measurements to the positioning network node or location server.

33. The method of any one of embodiments 22 to 32, wherein the positioning measurements comprise timing measurements.

34. The method of embodiment 33, wherein the timing measurements comprise one or more of time-of-arrival (TOA) and reference signal time difference (RSTD) measurements.

35. The method of any one of embodiments 22 to 34, wherein the CSI-RS configurations comprise one or more of: an index or identity used to generate a CSI-RS sequence used in the CSI-RS transmissions; a numerology of the CSI-RS transmissions; a bandwidth used in the CSI-RS transmissions; a direction of a beam used to transmit the CSI-RS transmissions; a transmission frequency of the CSI-RS transmissions; a quasi co-located (QCL) or transmission configuration indication (TCI) indication; a density of the CSI-RS transmissions (e.g., a number of CSI-RS resources used per radio resource); a frequency-hopping configuration used in the CSI-RS transmissions; a muting configuration used in the CSI-RS transmissions; and an indication as to whether the CSI-RS configuration is the same as that used by a reference radio network node.

36. The method of any one of embodiments 22 to 35, wherein the one or more radio network nodes comprise one or more of: a serving radio network node for the wireless device; a reference radio network node; and one or more neighbouring radio network nodes.
37. The method of any one of embodiments 22 to 36, wherein the indication of respective channel-state-information reference signal (CSI-RS) configurations utilized by one or more radio network nodes of the wireless network is contained within assistance data in respect of the one or more radio network nodes.
38. The method of any one of embodiments 22 to 37, wherein the CSI-RS transmissions are to be configured as, or are configured as, tracking reference signals.
39. The method of any one of embodiments 22 to 38, further comprising performing CSI-RS transmissions in accordance with the CSI-RS configuration.
40. A method performed by a base station relating to positioning of a wireless device in a wireless network, the method comprising:
    transmitting, to a wireless device, a configuration message comprising an indication of respective channel-state-information reference signal (CSI-RS) configurations utilized by one or more radio network nodes of the wireless network, enabling the wireless device to perform positioning measurements on CSI-RS transmissions by the one or more radio network nodes, based on the respective CSI-RS configurations.
41. The method of any of the previous embodiments, further comprising:
    obtaining user data; and
    forwarding the user data to a host computer or the wireless device.

Group C Embodiments

42. A method performed by a network node relating to positioning of a wireless device in a wireless network, the method comprising:
    preparing a configuration message comprising an indication of respective channel-state-information reference signal (CSI-RS) configurations utilized by one or more radio network nodes of the wireless network; and
    initiating transmission of the configuration message to a wireless device, enabling the wireless device to perform positioning measurements on CSI-RS transmissions by the one or more radio network nodes, based on the respective CSI-RS configurations.
43. The method of embodiment 42, further comprising receiving a capability of the wireless device to perform positioning measurements on CSI-RS transmissions.
44. The method of embodiment 43, wherein the capability of the wireless device to perform positioning measurements on CSI-RS transmissions is transmitted directly or indirectly to a positioning network node of the wireless network node.
45. The method of embodiment 43 or 44, wherein the capability of the wireless device to perform positioning measurements on CSI-RS transmissions comprises an indication of the wireless device to perform positioning measurements on CSI-RS transmissions comprising one or more of: CSI-RS based signal strength or quality measurements; CSI-RS timing measurements; CSI-RS angular measurements; CSI-RS based intra-frequency measurements; CSI-RS measurements for a primary cell (PCell); CSI-RS measurements for a primary secondary cell (PSCell); CSI-RS measurements for a secondary cell (SCell); CSI-RS measurements for intra-frequency neighbouring cells; CSI-RS based inter-frequency measurements; CSI-RS based measurements in a particular part of the transmission frequency spectrum; CSI-RS based measurements with a specific CSI-RS configuration; CSI-RS based intra-frequency measurements with measurement gaps; CSI-RS based intra-frequency measurements outside an active DL bandwidth part of the wireless device; measurements on CSI-RS transmissions with one or more specific quasi co-located (QCL) properties or transmission configuration indication (TCI) states; CSI-RS based measurements based on minimum requirements of the wireless device for performing CSI-RS based measurements; CSI-RS based measurements with a certain relation to synchronization signal (SS)physical broadcast channel (PBCH) Block Measurement Time Configuration (SMTC); CSI-RS based measurements based on a particular numerology.
46. The method of any one of embodiments 43 to 45, wherein the indication of the CSI-RS configurations is generated based on the capability of the wireless device to perform positioning measurements on CSI-RS transmissions.
47. The method of any one of embodiments 42 to 46, wherein the CSI-RS configuration relates to one or more CSI-RS resources utilized by the one or more radio network nodes.
48. The method of embodiment 47, wherein the one or more CSI-RS resources comprise a CSI-RS resource set.
49. The method of embodiment 48, wherein the CSI-RS resource set comprises one or more of an information element TRS-info set and a CSI-RS for tracking (also referred to as a tracking reference signal).
50. The method of any one of embodiments 42 to 49, wherein a respective CSI-RS configuration relates to one or more of a cell served by the radio network node or a beam transmitted by the radio network node.
51. The method of any one of embodiments 42 to 50, wherein the one or more radio network nodes comprise one or more of a transmission reception point and a base station.
52. The method of any one of embodiments 42 to 51, wherein the positioning measurements comprise timing measurements.
53. The method of embodiment 52, wherein the timing measurements comprise one or more of time-of-arrival (TOA) and reference signal time difference (RSTD) measurements.
54. The method of any one of embodiments 42 to 53, wherein the CSI-RS configurations comprise one or more of: an index or identity used to generate a CSI-RS sequence used in the CSI-RS transmissions; a numerology of the CSI-RS transmissions; a bandwidth used in the CSI-RS transmissions; a direction of a beam used to transmit the CSI-RS transmissions; a transmission frequency of the CSI-RS transmissions; a quasi co-located (QCL) or transmission configuration indication (TCI) indication; a density of the CSI-RS transmissions (e.g., a number of CSI-RS resources used per radio resource); a frequency-hopping configuration used in the CSI-RS transmissions; a muting configuration used in the CSI-RS transmissions; and an indication as to whether the CSI-RS configuration is the same as that used by a reference radio network node.
55. The method of any one of embodiments 42 to 54, wherein the one or more radio network nodes comprise one or more of: a serving radio network node for the wireless device; a reference radio network node; and one or more neighbouring radio network nodes.
56. The method of any one of embodiments 42 to 55, further comprising receiving the positioning measurements from the wireless device, and determining a location of the wireless device based on the positioning measurements.
57. The method of any one of embodiments 42 to 56, wherein the indication of respective channel-state-information reference signal (CSI-RS) configurations utilized by one or more radio network nodes of the wireless network is contained within assistance data in respect of the one or more radio network nodes.
58. The method of any one of embodiments 42 to 57, wherein the CSI-RS transmissions are to be configured as, or are configured as, tracking reference signals.
59. The method of any one of embodiments 42 to 58, further comprising receiving, from the one or more radio network nodes, respective indications of the CSI-RS configurations.
60. The method of any one of embodiments 42 to 59, wherein the network node comprises a positioning network node or location server.
61. The method of any one of embodiments 42 to 60, wherein the network node is implemented within a radio network node.

Group D Embodiments

62. A wireless device, the wireless device comprising:
  processing circuitry configured to perform any of the steps of any of the Group A embodiments; and
  power supply circuitry configured to supply power to the wireless device.
63. A base station, the base station comprising:
  processing circuitry configured to perform any of the steps of any of the Group B embodiments;
  power supply circuitry configured to supply power to the base station.
64. A network node, comprising:
  processing circuitry configured to perform any of the steps of any of the Group C embodiments;
  power supply circuitry configured to supply power to the network node.
65. A user equipment (UE), the UE comprising:
  an antenna configured to send and receive wireless signals;
  radio front-end circuitry connected to the antenna and to processing circuitry, and configured
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.
66. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.
67. The communication system of the previous embodiment further including the base station.
68. The communication system of the previous 2 embodiments, further including the UE, wherein the UE is configured to communicate with the base station.
69. The communication system of the previous 3 embodiments, wherein:
  the processing circuitry of the host computer is configured to execute a host application, thereby providing the user data; and
  the UE comprises processing circuitry configured to execute a client application associated with the host application.
70. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.
71. The method of the previous embodiment, further comprising, at the base station, transmitting the user data.
72. The method of the previous 2 embodiments, wherein the user data is provided at the host computer by executing a host application, the method further comprising, at the UE, executing a client application associated with the host application.
73. A user equipment (UE) configured to communicate with a base station, the UE comprising a radio interface and processing circuitry configured to performs the of the previous 3 embodiments.
74. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.
75. The communication system of the previous embodiment, wherein the cellular network further includes a base station configured to communicate with the UE.
76. The communication system of the previous 2 embodiments, wherein:
  the processing circuitry of the host computer is configured to execute a host application, thereby providing the user data; and the UE's processing circuitry is configured to execute a client application associated with the host application.

77. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

78. The method of the previous embodiment, further comprising at the UE, receiving the user data from the base station.

79. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

80. The communication system of the previous embodiment, further including the UE.

81. The communication system of the previous 2 embodiments, further including the base station, wherein the base station comprises a radio interface configured to communicate with the UE and a communication interface configured to forward to the host computer the user data carried by a transmission from the UE to the base station.

82. The communication system of the previous 3 embodiments, wherein:
the processing circuitry of the host computer is configured to execute a host application; and
the UE's processing circuitry is configured to execute a client application associated with the host application, thereby providing the user data.

83. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

84. A method implemented in a communication system including a host computer, a base station and a user equipment (UE), the method comprising:
at the host computer, receiving user data transmitted to the base station from the UE, wherein the UE performs any of the steps of any of the Group A embodiments.

85. The method of the previous embodiment, further comprising, at the UE, providing the user data to the base station.

86. The method of the previous 2 embodiments, further comprising:
at the UE, executing a client application, thereby providing the user data to be transmitted; and
at the host computer, executing a host application associated with the client application.

87. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

88. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

89. The communication system of the previous embodiment further including the base station.

90. The communication system of the previous 2 embodiments, further including the UE, wherein the UE is configured to communicate with the base station.

91. The communication system of the previous 3 embodiments, wherein:
the processing circuitry of the host computer is configured to execute a host application;
the UE is configured to execute a client application associated with the host application, thereby providing the user data to be received by the host computer.

92. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

93. The method of the previous embodiment, further comprising at the base station, receiving the user data from the UE.

94. The method of the previous 2 embodiments, further comprising at the base station, initiating a transmission of the received user data to the host computer.

The invention claimed is:

1. A method performed by a wireless device relating to positioning in a wireless network, the method comprising:
receiving, in a same slot or a same subframe, user data and a reference signal for performing positioning measurements in a transmission from a radio network node; and
rate matching the user data over one or more radio resources not used by the reference signal.

2. The method of claim 1, wherein rate matching the user data over one or more radio resources not used by the reference signal comprises:
receiving the user data on only the one or more radio resources not used by the reference signal; and
adapting decoding of the user data to account for receiving the user data on only the one or more radio resources not used by the reference signal.

3. The method of claim 1, wherein rate matching the user data over one or more radio resources not used by the reference signal comprises rate matching the user data over resource elements of the same slot or the same subframe not including resource elements or a symbol used by the reference signal.

4. The method of claim 1, wherein rate matching the user data over one or more radio resources not used by the reference signal comprises rate matching the user data over one or more radio resources not used by the reference signal based on received higher layer signaling.

5. The method of claim 1, wherein the reference signal comprises one or more channel-state-information reference signals (CSI-RS).

6. The method of claim 1, further comprising:
receiving, from a network node, a configuration message comprising an indication of respective channel-state-information reference signal (CSI-RS) configurations utilized by one or more radio network nodes of the wireless network; and
performing positioning measurements on CSI-RS transmissions by the one or more radio network nodes, based on the respective CSI-RS configurations.

7. The method of claim 6, further comprising transmitting a capability of the wireless device to perform positioning measurements on CSI-RS transmissions.

8. The method of claim 7, wherein the capability of the wireless device to perform positioning measurements on CSI-RS transmissions is transmitted directly or indirectly to a positioning network node of the wireless network node.

9. The method of claim 7, wherein the capability of the wireless device to perform positioning measurements on CSI-RS transmissions comprises an indication of the wireless device to perform positioning measurements on CSI-RS transmissions comprising one or more of: CSI-RS based signal strength or quality measurements; CSI-RS timing measurements; CSI-RS angular measurements; CSI-RS based intra-frequency measurements; CSI-RS measurements for a primary cell (PCell); CSI-RS measurements for a primary secondary cell (PSCell); CSI-RS measurements for a secondary cell (SCell); CSI-RS measurements for intra-frequency neighbouring cells; CSI-RS based inter-frequency measurements; CSI-RS based measurements in a particular part of the transmission frequency spectrum; CSI-RS based measurements with a specific CSI-RS configuration; CSI-RS based intra-frequency measurements with measurement gaps; CSI-RS based intra-frequency measurements outside an active DL bandwidth part of the wireless device; measurements on CSI-RS transmissions with one or more specific quasi co-located (QCL) properties or transmission configuration indication (TCI) states; CSI-RS based measurements based on minimum requirements of the wireless device for performing CSI-RS based measurements; CSI-RS based measurements with a certain relation to synchronization signal (SS)/physical broadcast channel (PBCH) Block Measurement Time Configuration (SMTC); CSI-RS based measurements based on a particular numerology.

10. The method of claim 7, wherein the indication of the CSI-RS configurations is generated based on the capability of the wireless device to perform positioning measurements on CSI-RS transmissions.

11. The method of claim 6, wherein the CSI-RS configuration relates to one or more CSI-RS resources utilized by the one or more radio network nodes and the one or more CSI-RS resources comprise a CSI-RS resource set.

12. The method of claim 11, wherein the CSI-RS resource set comprises one or more of an information element TRS-info set and a CSI-RS for tracking.

13. The method of claim 6, wherein a respective CSI-RS configuration relates to one or more of a cell served by the radio network node or a beam transmitted by the radio network node.

14. The method of claim 6, wherein the positioning measurements comprise timing measurements, wherein the timing measurements comprise one or more of time-of-arrival (TOA) and reference signal time difference (RSTD) measurements.

15. The method of claim 6, wherein the CSI-RS configurations comprise one or more of: an index or identity used to generate a CSI-RS sequence used in the CSI-RS transmissions; a numerology of the CSI-RS transmissions; a bandwidth used in the CSI-RS transmissions; a direction of a beam used to transmit the CSI-RS transmissions; a transmission frequency of the CSI-RS transmissions; a quasi co-located (QCL) or transmission configuration indication (TCI) indication; a density of the CSI-RS transmissions (e.g., a number of CSI-RS resources used per radio resource); a frequency-hopping configuration used in the CSI-RS transmissions; a muting configuration used in the CSI-RS transmissions; and an indication as to whether the CSI-RS configuration is the same as that used by a reference radio network node.

16. The method of claim 6, further comprising:
reporting the positioning measurements to a positioning network node of the wireless network, enabling the positioning network node to determine a location of the wireless device based on the positioning measurements; or
determining a location of the wireless device based on the positioning measurements.

17. The method of claim 6, wherein the indication of respective channel-state-information reference signal (CSI-RS) configurations utilized by one or more radio network nodes of the wireless network is contained within assistance data in respect of the one or more radio network nodes.

18. The method of claim 1, further comprising:
performing positioning measurements on the received reference signal.

19. A wireless device comprising:
radio circuitry; and
processing circuitry operatively coupled to the radio circuitry and configured to:
receive, in a same slot or a same subframe, user data and a reference signal for performing positioning measurements in a transmission from a radio network node, using the radio circuitry; and
rate match the user data over one or more radio resources not used by the reference signal.

20. The wireless device of claim 19, wherein the processing circuitry is configured to rate match the user data over one or more radio resources not used by the reference signal by:
receiving the user data on only the one or more radio resources not used by the reference signal; and
adapting decoding of the user data to account for receiving the user data on only the one or more radio resources not used by the reference signal.

21. The wireless device of claim 19, wherein the processing circuitry is configured to rate match the user data over one or more radio resources not used by the reference signal by rate matching the user data over resource elements of the same slot or the same subframe not including resource elements or a symbol used by the reference signal.

* * * * *